US010657682B2

(12) United States Patent
Krs et al.

(10) Patent No.: US 10,657,682 B2
(45) Date of Patent: May 19, 2020

(54) DRAWING CURVES IN SPACE GUIDED BY 3-D OBJECTS

(71) Applicant: Adobe Inc., San Jose, CA (US)

(72) Inventors: Vojtech Krs, Lafayette, IN (US); Radomir Mech, Mountain View, CA (US); Nathan Aaron Carr, San Jose, CA (US); Mehmet Ersin Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 62 days.

(21) Appl. No.: 15/485,980

(22) Filed: Apr. 12, 2017

(65) Prior Publication Data

US 2018/0300912 A1    Oct. 18, 2018

(51) Int. Cl.
*G06T 11/20*  (2006.01)
*G06F 17/00*  (2019.01)

(52) U.S. Cl.
CPC ............ *G06T 11/203* (2013.01); *G06F 17/00* (2013.01); *G06T 11/206* (2013.01)

(58) Field of Classification Search
CPC ...... G06T 11/00; G06T 11/203; G06T 11/206; G06T 15/00; G06T 15/02; G06T 15/08; G06T 17/00; G06T 19/00; G06F 17/30805; G06F 17/00; H04N 13/388
USPC ......................................................... 345/419
See application file for complete search history.

(56) References Cited

U.S. PATENT DOCUMENTS

| 7,750,911 | B2 | 7/2010 | Bae |
| 8,669,995 | B2 | 3/2014 | Winnemoeller et al. |
| 9,330,482 | B2 | 5/2016 | Ishida |
| 9,857,876 | B2 | 1/2018 | Hare et al. |
| 10,019,440 | B2 | 7/2018 | Joshi et al. |
| 2006/0082571 | A1* | 4/2006 | McDaniel ............. G06T 11/203 345/419 |
| 2006/0132495 | A1* | 6/2006 | Anderson ............. G06T 11/203 345/581 |
| 2009/0195536 | A1* | 8/2009 | Louise ............... G01R 13/0236 345/419 |
| 2009/0284550 | A1* | 11/2009 | Shimada ............. G06F 17/5095 345/619 |
| 2010/0194694 | A1 | 8/2010 | Kraft et al. |
| 2010/0199226 | A1 | 8/2010 | Nurmi |
| 2011/0071818 | A1 | 3/2011 | Jiang |
| 2012/0038735 | A1 | 2/2012 | Hasegawa |
| 2012/0144283 | A1 | 6/2012 | Hill et al. |
| 2013/0016914 | A1 | 1/2013 | Kennard et al. |

(Continued)

OTHER PUBLICATIONS

Nealen, A., Sorkine, O., Alexa, M., & Cohen-Or, D. (Aug. 2007). A sketch-based interface for detail-preserving mesh editing. In ACM SIGGRAPH 2007 courses (p. 42). ACM (Year: 2007).*

(Continued)

*Primary Examiner* — Sae Won Yoon
(74) *Attorney, Agent, or Firm* — SBMC

(57) ABSTRACT

Various embodiments enable curves to be drawn around 3-D objects by intelligently determining or inferring how the curve flows in the space around the outside of the 3-D object. The various embodiments enable such curves to be drawn without having to constantly rotate the 3-D object. In at least some embodiments, curve flow is inferred by employing a vertex position discovery process, a path discovery process, and a final curve construction process.

20 Claims, 17 Drawing Sheets

(56) References Cited

U.S. PATENT DOCUMENTS

| | | | |
|---|---|---|---|
| 2013/0127836 A1* | 5/2013 | Joshi | G06T 11/203 345/419 |
| 2014/0341463 A1* | 11/2014 | Ramalingam | G06T 7/543 382/154 |
| 2015/0169975 A1 | 6/2015 | Kienzle et al. | |
| 2015/0371417 A1 | 12/2015 | Angelov et al. | |
| 2016/0253090 A1 | 9/2016 | Angelov et al. | |
| 2017/0017323 A1 | 1/2017 | Yu et al. | |
| 2017/0018116 A1* | 1/2017 | Sun | G06T 7/0012 |
| 2017/0083276 A1 | 3/2017 | Lee et al. | |
| 2017/0289219 A1 | 10/2017 | Khalid et al. | |
| 2018/0075658 A1 | 3/2018 | Lanier et al. | |
| 2018/0239434 A1 | 8/2018 | Lu et al. | |

OTHER PUBLICATIONS

Masry, M., & Lipson, H. (Aug. 2007). A sketch-based interface for iterative design and analysis of 3d objects. In ACM SIGGRAPH 2007 courses (p. 31) (Year: 2007).*

"Combined Search and Examination Report", GB Application No. 1720867.9, May 24, 2018, 6 pages.

"Final Office Action", U.S. Appl. No. 15/438,276, dated Feb. 12, 2019, 18 pages.

"First Action Interview Office Action", U.S. Appl. No. 15/438,276, dated Nov. 5, 2018, 7 pages.

"Foreign Office Action", GB Application No. 1720867.9, Jun. 21, 2019, 3 pages.

"Holo Lens Studio Demo", Retrieved at: https://www.youtube.com/watch?v=qym11JnFQBM—on Feb. 13, 2019, Jan. 21, 2015, 1 page.

"Non-Final Office Action", U.S. Appl. No. 15/438,276, dated Jun. 14, 2019, 30 pages.

"Pre-Interview First Office Action", U.S. Appl. No. 15/438,276, dated Oct. 4, 2018, 8 pages.

"Notice of Allowance", U.S. Appl. No. 15/438,276, dated Dec. 11, 2019, 8 pages.

"Corrected Notice of Allowability", U.S. Appl. No. 15/438,276, dated Mar. 25, 2020, 2 pages.

* cited by examiner

1600

```
┌─────────────────────────────────────────────────────────────────┐
│  Receive input defining a 2-D curve that has been drawn         │
│  relative to a 3-D object                                       │
│                            1602                                  │
└─────────────────────────────────────────────────────────────────┘
                                │
                                ▼
┌─────────────────────────────────────────────────────────────────┐
│  Discover point positions associated with the 2-D curve         │
│                            1604                                  │
└─────────────────────────────────────────────────────────────────┘
                                │
                                ▼
┌─────────────────────────────────────────────────────────────────┐
│  Construct a graph from discovered point positions              │
│                            1606                                  │
└─────────────────────────────────────────────────────────────────┘
                                │
                                ▼
┌─────────────────────────────────────────────────────────────────┐
│  Process constructed graph to define multiple different 3-D     │
│  curves, without having to visually rotate the 3-D object       │
│                            1608                                  │
└─────────────────────────────────────────────────────────────────┘
                                │
                                ▼
┌─────────────────────────────────────────────────────────────────┐
│  Select a final 3-D curve that satisfies one or more            │
│  constraints that have been defined for the final 3-D curve     │
│                            1610                                  │
└─────────────────────────────────────────────────────────────────┘
```

*Fig. 16*

DRAWING CURVES IN SPACE GUIDED BY 3-D OBJECTS

BACKGROUND

Three-dimensional (3-D) curves are used to create a wide range of digital content including digital images, digital movies, and the like. Modelling 3-D curves using conventional systems, however, is hard and tedious and typically requires multiple viewpoints and iterations. Specifically, conventional systems require a designer to generate 3-D content on a 2-dimensional (2-D) screen using a mouse or a stylus. In this instance, there is a 2-D view inside of a 3-D environment. Accordingly, if the designer wishes to draw or sketch some curves from a single viewpoint it becomes non-trivial to enable the designer to do so. This is because the designer has a 2-D input device on a 2-D flat display on which they are attempting to draw a 3-D curve. What occurs in many conventional modeling systems today is that in order to draw a 3-D curve, the model constantly has to iteratively rotate to provide multiple viewpoints. So, for example, the designer may draw a first portion of a curve and then the model will have to rotate to show the next portion of the model to enable the designer to draw the next portion of the curve. This process typically happens over and over. That is, the designer will draw a curve portion, the model will rotate, the designer will draw a next curve portion, the model will rotate, and so on. This process can be very slow and tiring for the designer.

SUMMARY

This summary introduces a selection of concepts in a simplified form that are further described below in the detailed description. As such, this summary is not intended to identify essential features of the claimed subject matter, nor is it intended to be used as an aid in determining the scope of the claimed subject matter.

A three-dimensional (3-D) drawing module enables curves to be drawn around 3-D objects by determining or inferring how a 2-D curve drawn by a designer relative to a 3-D object flows in the space around the outside of the 3-D object. That is, the 3-D drawing module receives, as input, a 2-D curve that is drawn relative to a 3-D object, and determines or infers how the curve wraps around the 3-D object such as by having curve portions that appear in front of and behind the 3-D object. The 3-D drawing module can draw such curves without having to rotate the 3-D object and move between different views of the 3-D object. In at least some embodiments, the 3-D drawing module infers curve flow by employing a vertex position discovery module, a path discovery module, and a final curve construction module.

The vertex position discovery module is designed to enable the topology of the 2-D curve to be determined so that a final 3-D curve can be rendered relative to the 3-D object. The vertex position discovery module receives, as input, the 3-D input scene geometry and a 2-D curve composed of a set of 2-D points and finds a set of candidate 3-D vertices in 3-D space for each 2-D point, and their distance (referred to as "height") from the 3-D input scene geometry. The candidate 3-D vertices are the possible locations of the 2-D point in the 3-D space. To do so, in a preferred embodiment, the vertex position discovery module employs a segmentation module, a distance estimation module, and an isosurface intersection module.

The segmentation module determines intersecting and non-intersecting intervals of a drawn 2-D curve relative to a 3-D object and "depth jumps", which define intersecting intervals at different depths relative to the 3-D object. An intersecting interval is a 2-D curve interval composed of a series of "on points" that lie visually in front of the 3-D object so as to visually overlap (i.e. appear "on" the 3-D object), while a non-intersecting interval is a 2-D curve interval composed of a series of "off points" that do not lie visually in front of the 3-D object and hence, do not visually overlap (i.e. do not appear "on" the 3-D object). The distance estimation module estimates distances or heights of individual points that lie on the 2-D curve's intersecting and non-intersecting intervals, as determined by the segmentation module, relative to the 3-D object. In one embodiment, the distance estimation module projects rays from a central location through the individual 2-D points and based on their intersection with the 3-D object, classifies the 2-D points as "on" and "off" points. For points that lie on a non-intersecting interval, a minimum distance from the corresponding ray to the object is found. For points that lie on an intersecting interval, an interpolation process is employed that interpolates a distance using at least one point that lies on a non-intersecting interval. That is, the non-intersecting rays are used to estimate the distance or height for each sequence of an "on" 3-D vertice. Thus, in this embodiment, the distance estimation process can produce, for any one particular ray, multiple points at different distances or depths due to the fact that a ray can pass over, under or through the 3-D object to produce multiple possibilities for a point's location. The isosurface intersection module then finds all points on a ray at a given distance that can be defined by the designer. Finding all points at a given distance on a ray helps to ensure that points are not considered that may be arbitrarily far from the 3-D object. In a preferred embodiment, the isosurface intersection process discards occluded front-facing points because these points represent poorer choices for where a 3-D curve may lie. The vertex position discovery module thus produces a collection of points which represent possible locations of a 3-D curve. Depending on the complexity of the 3-D object, the collection of points might collectively represent many different 3-D curve possibilities.

The path discovery module employs segment graph construction to create a graph of vertex segments at varying depths that is later used to find a desired 3-D curve. In one embodiment, the path discovery module uses a scoring process to select a final 3-D curve from the collection of points that represent the many different 3-D curve possibilities. The path discovery process does this by employing a point-to-point graph module and a segment-to-segment graph module.

The point-to-point graph module finds all plausible connections of adjacent points at various depths. In one embodiment, this is constrained by distance, angle, and whether a point intersects the 3-D object. So, for example, a point from the collection of points may have multiple different possibilities for the next-adjacent point on the curve. Thus, in this embodiment, the point-to-point graph module is designed to find all of these plausible next-adjacent points. Non-intersecting parts and depth jumps are at undetermined positions, but are included in the graph connections.

The segment-to-segment graph module is designed to enable a score to be computed which can then be used as a basis to select the final 3-D curve. The segment-to-segment graph module uses the point-to-point graph to construct multiple different segments of the multiple different 3-D curve possibilities. In one embodiment, each segment is then scored in terms of its curvature and any other parameters that may have been defined for selecting the final 3-D curve. The segment-to-segment graph module employs graph nodes that are composed of "on" points (referred to collectively as "on segments"), and graph edges which represent the parts of an input stroke that do not intersect the 3-D scene geometry (referred to collectively as "off segments"). The off segments are constructed between individual on segments. Each graph node is scored by its total curvature and undetermined parts (i.e. off segments) are interpolated between their determined parts (i.e. on segments) and are subsequently scored by their curvature.

The final curve construction process employs a shortest path module to find the shortest or best path through the segment-to-segment graph. Once the best path is found through the segment-to-segment graph, a curve fitting module constructs a smooth cubic spline as the final 3-D curve. It does so by considering the scores of each segment (both on and off segments), and reconstructing the 3-D curve from segments having the best scores to produce the final 3-D curve that constitutes a concatenation of the selected segments. The final 3-D curve can then be smoothed using various constraints. In addition, editing operations such as changes in curve depth and curve redrawing can be provided. Thus, a designer may select a segment that is drawn in front of the 3-D scene geometry to now appear to pass behind the 3-D scene geometry and vice versa.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 16 illustrates a flow diagram that describes operations in accordance with one or more embodiments.

DETAILED DESCRIPTION

Overview

Figure 1:
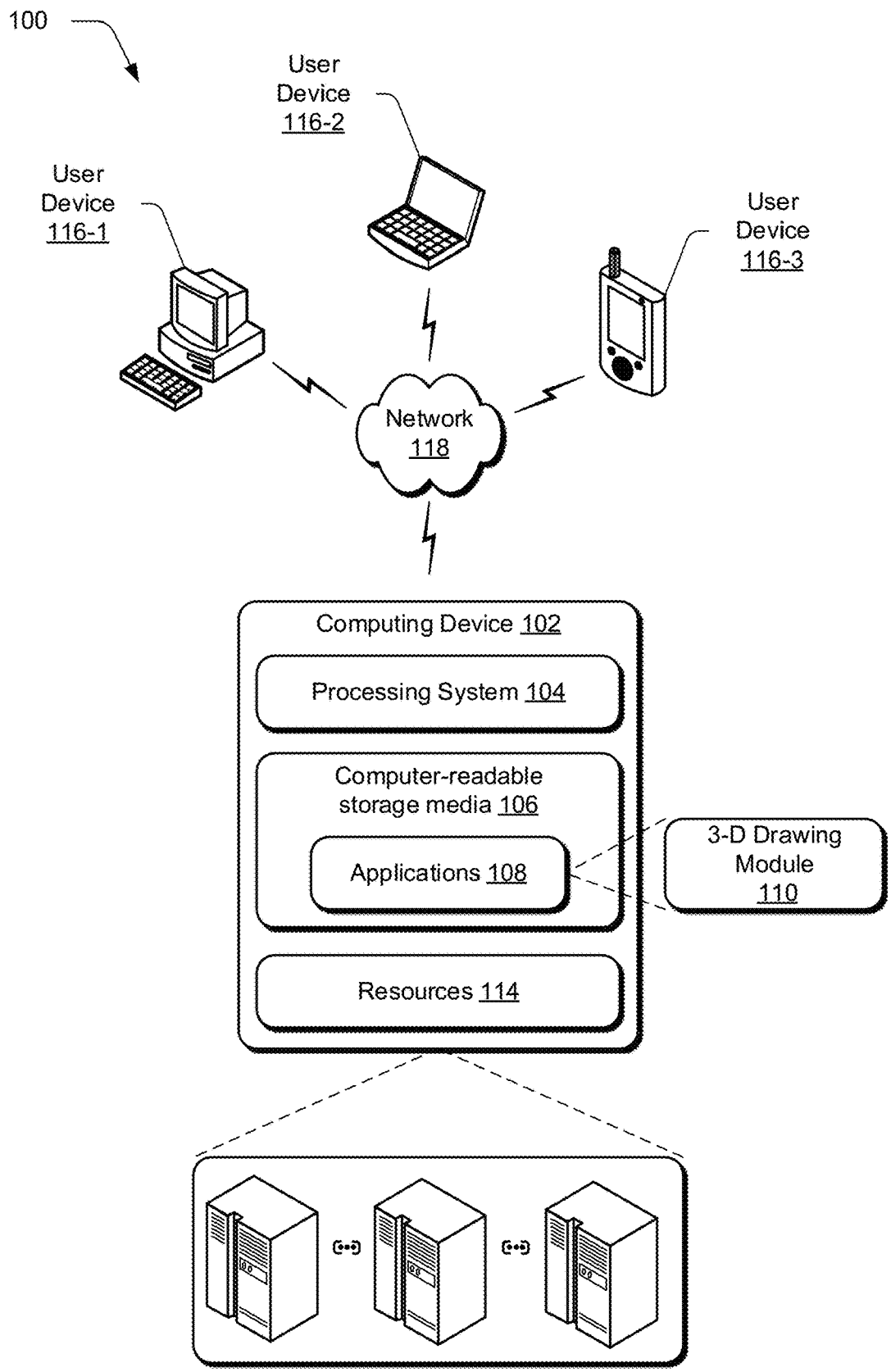
FIG. 1 is an illustration of a digital medium environment in an example implementation that is operable to employ techniques described herein.

A three-dimensional (3-D) drawing module enables curves to be drawn around 3-D objects by determining or inferring how a 2-D curve drawn by a designer relative to a 3-D object flows in the space around the outside of the 3-D object. That is, the 3-D drawing module receives, as input, a 2-D curve that is drawn relative to a 3-D object, and determines or infers how the curve wraps around the 3-D object such as by having curve portions that appear in front of and behind the 3-D object. The 3-D drawing module can draw such curves without having to rotate the 3-D object and move between different views of the 3-D object.

The process described below breaks down the problem of drawing curves around 3-D objects into two different stages. In a first of the stages, the three-dimensional (3-D) drawing module processes a 2-D curve that is drawn by a designer relative to a 3-D object to determine the topology of the curve. The topology of the curve refers to how the curve should flow around the object. That is, the topology determines whether curve portions flow under, behind, or in front of a particular 3-D object. Once the topology of the curve is determined, in a second of the stages, the three-dimensional (3-D) drawing module refines the curve by improving the location of the curve, relative to the 3-D object, to make the curve more aesthetically pleasing. This is done by smoothing the curve to enhance the visual properties of the curve by removing features that might be visually distracting, such as abrupt transitions, roughness, jitter, and the like.

The technical solution provided by the various embodiments enable such curves to be drawn without having to repeatedly rotate the 3-D object which can be visually distracting and annoying for a designer. Thus, the technical solution provided by the various embodiments solves the technical problem of having to repeatedly rotate the 3-D object which is visually distracting and time-consuming for a user. The technical solution enables a curve to be quickly rendered around a 3-D object to provide a user with quick and fairly immediate feedback on what the curve they have drawn looks like in 3-D space.

In at least some embodiments, the 3-D drawing module infers curve flow by employing a vertex position discovery module, a path discovery module, and a final curve construction module.

The vertex position discovery module is designed to enable the topology of the 2-D curve to be determined so that a final 3-D curve can be rendered relative to the 3-D object. The vertex position discovery module receives, as input, a 3-D input scene geometry, i.e., an object, and a 2-D curve composed of a set of 2-D points and finds a set of candidate 3-D vertices in 3-D space for each 2-D point, and their distance (referred to as "height") from the 3-D input scene geometry. The candidate 3-D vertices are the possible locations of the 2-D point in the 3-D space. To do so, in a preferred embodiment, the vertex position discovery module employs a segmentation module, a distance estimation module, and an isosurface intersection module.

The segmentation module determines intersecting and non-intersecting intervals of a drawn 2-D curve relative to a 3-D object and depth jumps which define intersecting intervals at different depths relative to the 3-D object. An intersecting interval is a 2-D curve interval composed of a series of "on points" that lie visually in front of the 3-D object so as to visually overlap (i.e. appear "on" the 3-D object), while a non-intersecting interval is a 2-D curve interval composed of a series of "off points" that do not lie visually in front of the 3-D object and hence, do not visually overlap (i.e. do not appear "on" the 3-D object). The distance estimation module estimates distances or heights of individual points that lie on the 2-D curve's intersecting and non-intersecting intervals, as determined by the segmentation module, relative to the 3-D object. In one embodiment, the distance estimation module projects rays from a central location through the individual 2-D points and based on their intersection with the 3-D object, classifies the 2-D points as "on" and "off" points. For points that lie on a non-intersecting interval, a minimum distance from the corresponding ray to the object is found. For points that lie on an intersecting interval, an interpolation process is employed that interpolates a distance using at least one point that lies on a non-intersecting interval. That is, the non-intersecting rays are used to estimate the distance or height for each sequence of an "on" 3-D vertice. Thus, in this embodiment, distance estimation process can produce, for any one particular ray, multiple points at different distances or depths due to the fact that a ray can pass over, under or through the 3-D object to produce multiple possibilities for a point's location. The isosurface intersection module then finds all points on a ray at a given distance that can be defined by the designer. Finding all points at a given distance on a ray helps to ensure that points are not considered that may be arbitrarily far from the 3-D object. In a preferred embodiment, the isosurface intersection process discards occluded front-facing points because these points represent poorer choices for where a 3-D curve may lie. The vertex position discovery module thus produces a collection of points which represent possible locations of a 3-D curve. Depending on the complexity of the 3-D object, the collection of points might collectively represent many different 3-D curve possibilities.

The path discovery module employs segment graph construction to create a graph of vertex segments at varying depths that is later used to find a desired 3-D curve. In one embodiment, the path discovery module uses a scoring process to select a final 3-D curve from the collection of points that represent the many different 3-D curve possibilities. The path discovery process does this by employing a point-to-point graph module and a segment-to-segment graph module. The point-to-point graph module finds all plausible connections of adjacent points at various depths. In one embodiment, this is constrained by distance, angle, and whether a point intersects the 3-D object. So, for example, a point from the collection of points may have multiple different possibilities for the next-adjacent point on the curve. Thus, in this embodiment, the point-to-point graph module is designed to find all of these plausible next-adjacent points. Non-intersecting parts and depth jumps are at undetermined positions, but are included in the graph connections. The segment-to-segment graph module is designed to enable a score to be computed which can then be used as a basis to select the final 3-D curve. The segment-to-segment graph module uses the point-to-point graph to construct multiple different segments of the multiple different 3-D curve possibilities. In one embodiment, each segment is then scored in terms of its curvature and any other parameters that may have been defined for selecting the final 3-D curve. The segment-to-segment graph module employs graph nodes that are composed of "on" points (referred to collectively as "on segments"), and graph edges which represent the parts of an input stroke that do not intersect the 3-D scene geometry (referred to collectively as "off segments"). The off segments are constructed between individual on segments. Each graph node is scored by its total curvature and undetermined parts (i.e. off segments) are interpolated between their determined parts (i.e. on segments) and are subsequently scored by their curvature.

The final curve construction process employs a shortest path module to find the shortest or best path through the segment-to-segment graph. Once the best path is found through the segment-to-segment graph, a curve fitting module constructs a smooth cubic spline as the final 3-D curve. It does so by considering the scores of each segment (both on and off segments), and reconstructing the 3-D curve from segments having the best scores to produce the final 3-D curve that constitutes a concatenation of the selected segments. The final 3-D curve can then be smoothed using various constraints. In addition, editing operations such as changes in curve depth and curve redrawing can be provided. Thus, a designer may select a segment that is drawn in front of the 3-D scene geometry to now appear to pass behind the 3-D scene geometry and vice versa.

The described 3-D curve drawing techniques constitute an improvement over current approaches which require repeated rotation of a 3-D object to enable a 3-D curve to be drawn. In the illustrated and described embodiments, such constant object rotation is unnecessary because the 3-D curve path is able to be inferred through an improved curve-drawing process that employs a vertex position discovery module, a path discovery module, and a final curve construction module as described above and below. Thus, the designer can quickly scribble down a 2-D curve over a 3-D object and, through the innovative process described below, a final 3-D curve can be quickly and efficiently rendered. Thus, rather than having to iteratively draw individual curve portions in a time-consuming and resource intensive process, the designer can quickly, through a fluid, single-stroke process, provide a 2-D curve which can be quickly and efficiently rendered into a 3-D curve.

In the following discussion, an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 (e.g., a client device, a server hosting a service provider, and the like) including a processing system 104 that may include one or more processing devices, one or more computer-readable storage media 106, and various applications 108 embodied on the computer-readable storage media 106 and operable via the processing system 104 to implement corresponding functionality described herein. In at least some implementations, applications 108 includes a 3-D drawing module 110.

The 3-D drawing module 110 is configured to enable curves to be drawn around 3-D objects. Curves are drawn by the 3-D drawing module by determining or inferring how the curve flows in the space around the outside of the 3-D object. The various embodiments enable such curves to be drawn without having to constantly rotate the 3-D object. Thus, the 3-D drawing module is able to infer a 3-D curve shape from 2-D strokes that follow the 3-D scene geometry, with optional transient guide objects that can be added by the designer. In one or more embodiments, the user's 2-D stroke is converted to a set of equidistant points in the view plane. The distance that each point of the resulting 3-D curve should have from the geometry surface is estimated which, in turn, generates multiple candidate 3-D locations for each 2-D sample. Based on a curvature criterion a combination of 3-D points that make up the 3-D curve is found.

Applications 108 may also include a web browser which is operable to access various kinds of web-based resources (e.g., lists of actions, content, and services) from servers. Applications 108 may also include an interface operable to access assets and the like from various resources, including asset stores and policy databases. Applications 108 may further include an operating system for computing device 102 and other device applications.

The computing device 102 may be configured as any suitable type of computing device. For example, the computing device may be configured as a server, a server farm, a desktop computer, a laptop computer, a workstation, a mobile device (e.g., assuming a handheld configuration such as a tablet or mobile phone), a tablet, a router, a modem, a gateway, and so forth. Thus, the computing device 102 may range from full resource devices with substantial memory and processor resources (e.g., servers and personal computers) to a low-resource device with limited memory or processing resources (e.g., mobile devices). Additionally, computing device 102 may be representative of a plurality of different devices, such as multiple servers in a server farm of a service provider, or a single computing device, such as a client computing device. Each of the computing devices can include some or all components of 3-D drawing module 110, so that 3-D drawing module 110 can be implemented on one or more devices in part or in whole. Furthermore, computing device 102 may be representative of a plurality of different devices to perform operations "over the cloud" as further described in relation to FIG. 17.

Computing device 102 is also configured to make various resources 114 available to user devices. For instance, digital medium environment 100 further depicts one or more user devices 116-1, 116-2, and 116-3 (collectively, 116), configured to communicate with computing device 102 over a network 118, such as the Internet, (e.g., to provide a "cloud-based" computing environment). Three user devices are shown for simplicity, though any number of suitable user devices can communicate with computing device 102 over network 118, such as thousands of user devices. User devices 116 each include a web browser which is operable to access various kinds of web-based resources. User devices 116 can comprise any suitable type of user device, such as by way of example and not limitation, a desktop computer, a laptop computer, a workstation, a mobile device (e.g., assuming a handheld configuration such as a tablet or mobile phone), a tablet, a camera, a gaming station, and the like. Thus, the user devices 116 may range from full resource devices with substantial memory and processor resources (e.g., personal computers and game consoles) to a low-resource device with limited memory or processing resources (e.g., mobile devices).

Network 118 may comprise a variety of networks, including the Internet, an intranet, local area network (LAN), wide area network (WAN), personal area network (PAN), body area network (BAN), cellular networks, terrestrial networks, satellite networks, combinations of networks, and the like, and as such may be wired, wireless, or a combination thereof.

Generally, computing device 102 is configured to make various resources 114 available over the network 118 to clients (e.g., user devices 116). In some scenarios, users may sign up for accounts that are employed to access corresponding resources from a provider. The provider may authenticate credentials of a user (e.g., username and password) before granting access to an account and corresponding resources 114. Resources 114 may be licensed, purchased, or may be made freely available, (e.g., without authentication, license, or account-based access). The resources 114 can include any suitable combination of services and content made available over a network by one or more providers. Some examples of services include, but are not limited to, an online commerce service (e.g., providing sales of services and products online), a video editing service, 3-D drawing service, a photo editing service, a web development and management service, a collaboration service, a social networking service, a messaging service, an advertisement service, a movie distribution service, and so forth. Content may include various combinations of assets, including videos, ads, audio, multi-media streams, animations, images, web documents, web pages, applications, device applications, text documents, drawings, presentations, and the like.

Having considered an example digital medium environment, consider now a discussion of an overview of the techniques described herein.

Example Visual Overview

Figure 2:
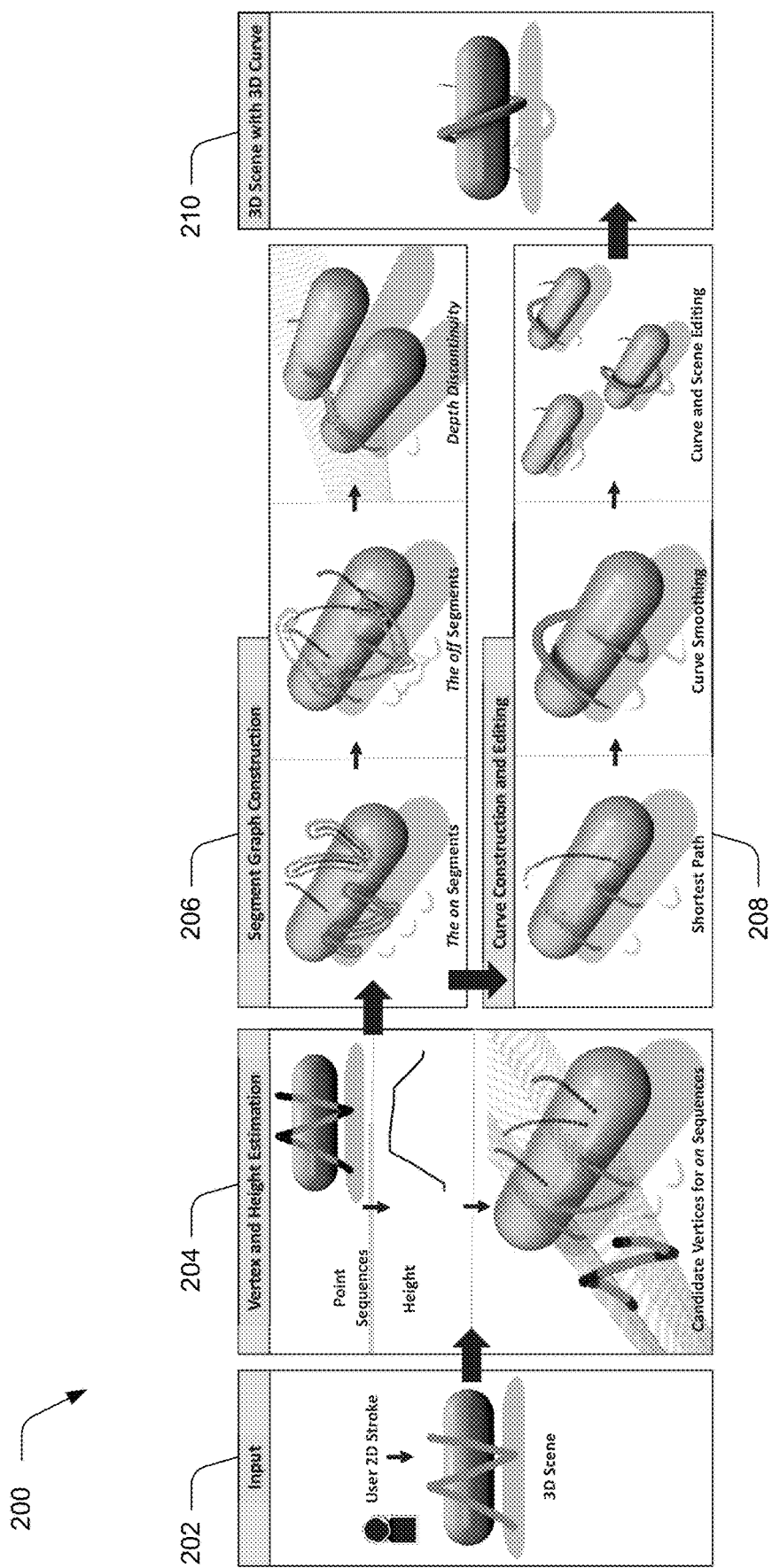
FIG. 2 is an illustration of an overview of the inventive process described herein in accordance with one or more embodiments.

FIG. 2 illustrates an example visual overview of the techniques implemented by the 3-D drawing module described herein in accordance with one or more embodiments, generally at 200. In operation, the 3-D drawing module displays a 3-D scene from a single view and the user draws a series of 2-D points, such as a curve, that are converted into a 3-D curve that passes through the scene. First, 3-D candidate vertices are found for intersecting parts of an input stroke. A segment graph is built from groups of the candidate vertices and is used to store all possible valid curves. The best curve is selected and converted into a full 3-D curve. The user can quickly select different curves and skip from one solution to another.

More specifically, the 3-D drawing module receives, as input at 202, a 2-D stroke input and a 3-D scene that includes one or more objects including optional transient objects, as described below in more detail.

In one or more embodiments, the vertex position discovery module is designed to perform vertex and height estimation at 204. Such enables the topology of the 2-D curve to be determined so that a final 3-D curve can be rendered relative to the 3-D object. The vertex position discovery module receives, as input, the 3-D input scene geometry and a 2-D curve composed of a set of 2-D points and finds a set of candidate 3-D vertices in 3-D space for each 2-D point, and their distance (referred to as "height") from the 3-D input scene geometry. The candidate 3-D vertices are the possible locations of the 2-D point in the 3-D space. In the illustrated example, such candidate set of vertices can be seen, at 204, to lie in front of the scene geometry and behind the scene geometry.

In one or more embodiments, the path discovery module employs segment graph construction, at 206, to create a graph of vertex segments at varying depths that is later used to find a desired 3-D curve. The path discovery module uses a scoring process to select a final 3-D curve from the collection of points that represent the many different 3-D curve possibilities. In one or more embodiments, the path discovery process does this by employing a point-to-point graph module and a segment-to-segment graph module which enable "on" and "off" segments to be determined as well as depth discontinuity analysis to be performed, as will be described in greater detail below.

In one or more embodiments, the final curve construction module employs a shortest path module, at 208, to find the shortest or best path through the segment-to-segment graph. Once the best path is found through the segment-to-segment graph, in one or more embodiments, a curve fitting module constructs a smooth cubic spline as the final 3-D curve. It does so by considering the scores of each segment (both on and off segments), and reconstructing the 3-D curve from segments having the best scores to produce the final 3-D curve that constitutes a concatenation of the selected segments. In one or more embodiments, the final 3-D can then be smoothed using various constraints. In addition, in at least some embodiments, the 3-D drawing module enables a designer to perform curve and scene editing by selecting portions of the curve to appear in front of or behind the 3-D object.

The final result, shown at 210, is a 3-D scene with a 3-D curve as intended by the designer.

Having considered a visual overview, consider now an example 3-D drawing module in accordance with one or more embodiments.

Example 3-D Drawing Module

Figure 3:
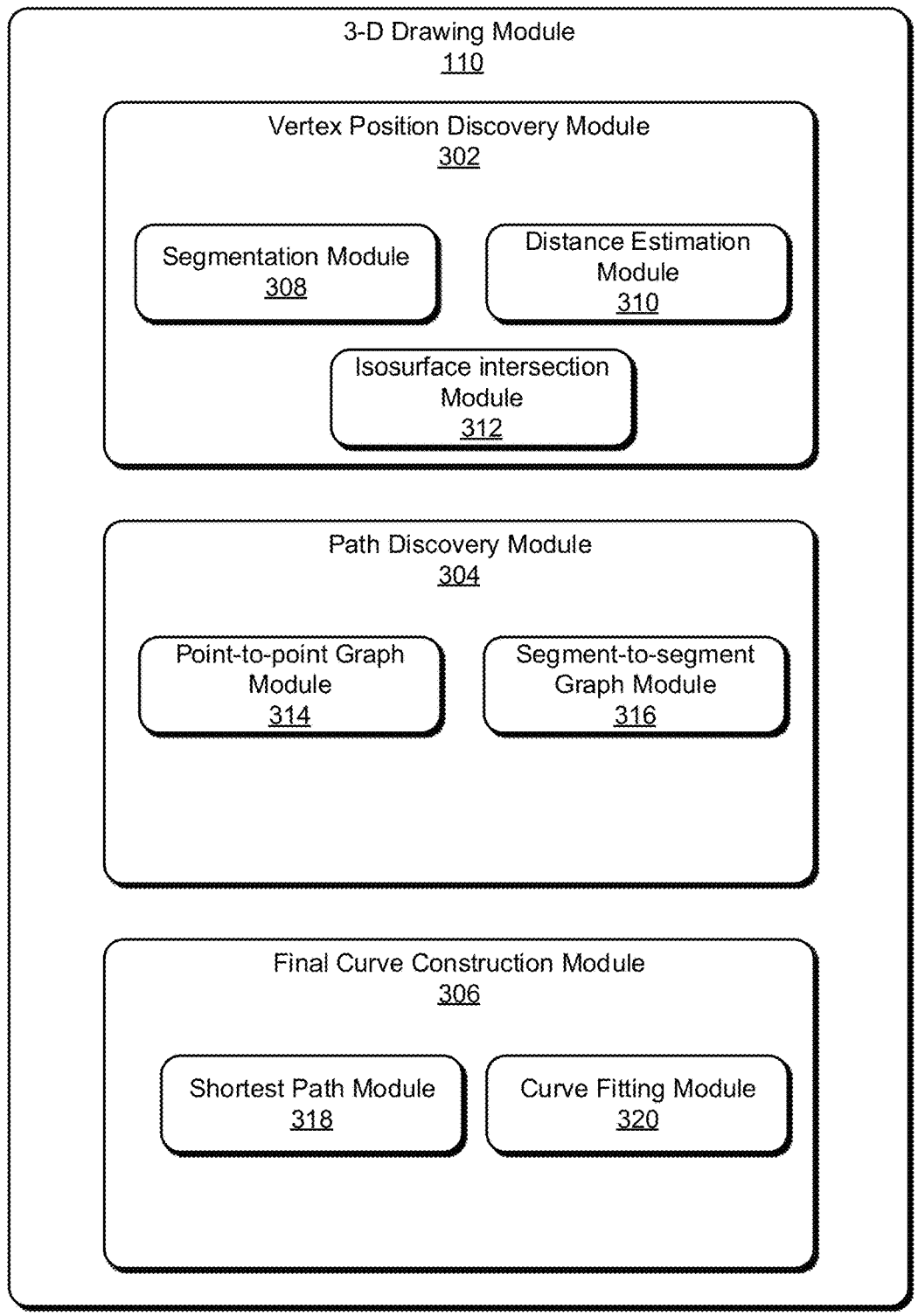
FIG. 3 is an example illustration of a 3-dimensional (3-D) drawing module in accordance with one or more embodiments.

FIG. 3 illustrates a digital medium environment 300 that includes an example 3-D drawing module 110. In this implementation, the 3-D drawing module 110 includes a vertex position discovery module 302, a path discovery module 304, and a final curve construction module 306.

This section is organized as follows: a discussion of the various modules of an example 3-D drawing module 110 is followed by a discussion of one specific way that the functionality of each module can be implemented. Following this, example procedures are described in accordance with one or more embodiments. Lastly, a discussion of an example system and device capable of implementing the described embodiments is provided.

Vertex Position Discovery Module

The vertex position discovery module 302 is designed to enable the topology of the 2-D curve to be determined so that a final 3-D curve can be rendered relative to the 3-D object. The vertex position discovery module 302 receives, as input, the 3-D input scene geometry, e.g., an object or objects, and a 2-D curve composed of a set of 2-D points and finds a set of candidate 3-D vertices in 3-D space for each 2-D point, and their distance (referred to as "height") from the 3-D input scene geometry. The candidate 3-D vertices are the possible locations of the 2-D point in the 3-D space. To do so, in a preferred embodiment, the vertex position discovery module 302 employs a segmentation module 308, a distance estimation module 310, and an isosurface intersection module 312.

In one or more embodiments, the segmentation module 308 determines intersecting and non-intersecting intervals of a drawn 2-D curve relative to a 3-D object and depth jumps which define intersecting intervals at different depths relative to the 3-D object. An intersecting interval is a 2-D curve interval composed of a series of "on points" that lie visually in front of the 3-D object so as to visually overlap (i.e. appear "on" the 3-D object), while a non-intersecting interval is a 2-D curve interval composed of a series of "off points" that do not lie visually in front of the 3-D object and hence, do not visually overlap (i.e. do not appear "on" the 3-D object). In one or more embodiments, the distance estimation module 310 estimates distances or heights of individual points that lie on the 2-D curve's intersecting and non-intersecting intervals, as determined by the segmentation module 308, relative to the 3-D object. To do so, in at least some embodiments, the distance estimation module 310 projects rays from a central location through the individual 2-D points and based on their intersection with the 3-D object, classifies the 2-D points as "on" and "off" points. In one or more embodiments, for points that lie on a non-intersecting interval, a minimum distance from the corresponding ray to the object is found. In one or more embodiments, for points that lie on an intersecting interval, an interpolation process is employed that interpolates a distance using at least one point that lies on a non-intersecting interval. That is, the non-intersecting rays are used to estimate the distance or height for each sequence of an "on" 3-D vertice. The distance estimation module 310 can produce, for any one particular ray, multiple points at different distances or depths due to the fact that a ray can pass over, under or through the 3-D object to produce multiple possibilities for a point's location. In one or more embodiments, the isosurface intersection module 312 then finds all points on a ray at a given distance that can be defined by the designer. Finding all points at a given distance on a ray helps to ensure that points are not considered that may be arbitrarily far from the 3-D object. In one or more embodiments, the isosurface intersection module 312 discards occluded front-facing points because these points represent poorer choices for where a 3-D curve may lie. The vertex position discovery module 302 thus produces a collection of points which represent possible locations of a 3-D curve. Depending on the complexity of the 3-D object, the collection of points might collectively represent many different 3-D curve possibilities.

Having considered an example vertex position discovery module, consider now an example implementation of the functionality of the vertex position discovery module. The discussion that follows in each of the "Example Implementation . . ." sections builds on the discussion of the "Example Implementation . . ." section(s) that preceed.

Example Implementation of Functionality of the Vertex Position Discovery Module

As noted above, in this implementation example, the input to the 3-D drawing module is a 3-D scene (e.g., a 3-D object, also referred to as a "geometry") and a set of strokes provided by a user that are sampled into sets of 2-D points.

Figure 4:
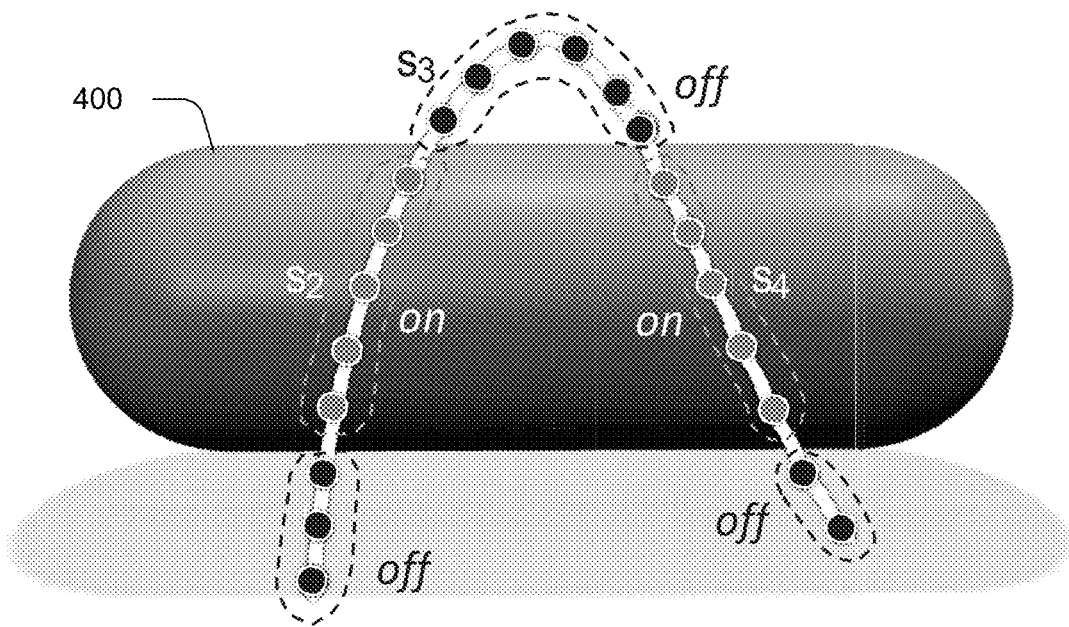
FIG. 4 illustrates an example 2-D stroke that is provided relative to a 3-D object in accordance with one or more embodiments.

The first step of the pipeline illustrated in FIG. 2 takes the sequence of the input 2-D points and the geometry and splits it into a sequence of "on" and "off" points that lie on the scene geometry. Such is shown in FIG. 4 where an example scene geometry is shown at 400 with "on" and "off" points designated as shown. Afterwards, the pipeline generates the candidate vertices in 3-D for the on sequences.

In the illustrated and described example, the sequence of 2-D input points is provided by the user in a single stroke. The input point sequence can have varying distances, so the input point sequence is resampled so that the new sequence is equidistant. The new point sequence is denoted by $P=(p_1, p_2, \ldots, p_{|P|})|p_i \in R^2$, where $|P|$ is the number of points. In one or more embodiments, the vertex position discovery module then divides the sequence of points into points that are "on" and "off" geometry after ray projection. In the illustrated and described example, an initial projection of the 2-D points $p_i$ is performed by casting a ray with direction $r_i$ from a camera position c and finding intersections with the objects in the scene.

The rays that intersect the geometry define "on" points while the non-intersecting points determine "off" points as shown in FIG. 4. There is an implicit ordering of the rays $r_i$ that is defined by the sequence of the input points $p_i$. Therefore, there is also an implicit ordering of the vertices $v_i$ in the 3-D space. Moreover, the points that are "off" geometry will later be used to determine the distance of the final curve from the actual object. In one or more embodiments, the vertex position discovery module then groups the points into successive sequences $S=<s_1, s_2, \ldots, s_{|S|}>$ with a flag whether the sequence is "on" or "off" geometry, as shown in FIG. 4.

Figure 5:
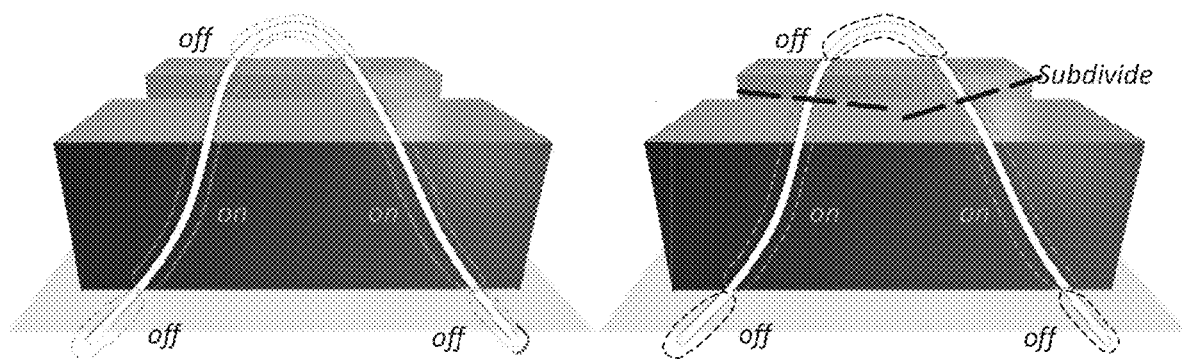
FIG. 5 illustrates a sequence of "on" 2-D points with depth discontinuity in accordance with one or more embodiments.

In at least some implementations, special care is taken for sequences of "on" points with so-called depth discontinuities, such as in FIG. 5. This situation indicates multiple obstructed surfaces and the "on" sequence needs to be split in two. In at least one implementation all "on" sequences are parsed and a check is performed for each pair of subsequent points by comparing the distance of the ray intersections. If the intersection is located at distances from the camera larger than a certain threshold, a check is performed as to whether the slope between those two intersections is continuous. In one or more embodiments, an additional ray is cast in between the successive points and a comparison is made to ascertain if the new intersection's distance is close to the average of the distance of the involved points. If the distance of the intersection of the new ray is close to either of the two vertices, the sequence is split in two. As can be seen in FIG. 5, the sequence of "on" 2-D points with depth discontinuity on the left is divided into two "on" sequences on the right.

Figure 6:
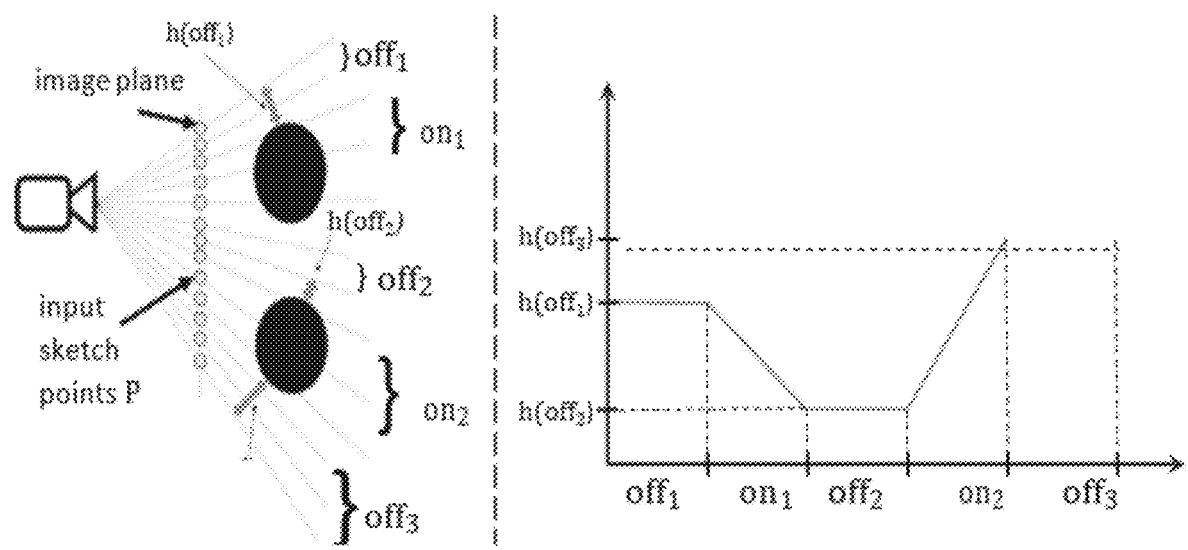
FIG. 6 illustrates how height of "on" sequences is interpolated from the neighboring "off" sequences in accordance with one or more embodiments.

Next, in one or more embodiments, the vertex position discovery module performs height estimation. That is, one goal of the described process is to draw the curve at a certain distance from the geometry. Although it would be possible to ask the user for an explicit distance value input, in one or more embodiments, a more intuitive way is used to infer the distance from the actual stroke. In particular, the distance of the curve from the geometry is derived from the distance of the rays defining the "off" points. The distance of the final curve from the geometry is referred to as its height and is denoted as h. Height is a function that returns the value for an input point $p_j$ or a sequence $s_i$. All points in an "off" sequence $s_i$ have their height $h(s_i)$ constant. It is found as the maximum distance of the rays that define the segment from the scene geometry as illustrated in FIG. 6. There, in one or more embodiments, the height of an "on" sequence is found by the linear interpolation of the heights of the neighboring "off" sequences. If the user starts or ends drawing on the object's surface the "on" sequence does not have two neighboring "off" sequences and the start or the end of the corresponding "on" sequence is set to zero.

After this step, all "off" sequences have constant height $h(s_i)$ and all "on" sequences have their height interpolated. The result of the distance estimation step is a mapping of the input points to the distance from the scene geometry.

Continuing, in one or more embodiments, the vector position discovery module now finds the candidate vertices v, but only for "on" sequences; the "off" sequences are processed differently as described in the section entitled "Implementation of Functionality of the Path Discovery Module" below. In the illustrated and described embodiment, a distance field df for the entire scene is generated using the $L_2$ norm. The distance field significantly speeds up the distance calculations, as will be appreciated by the skilled artisan.

In order to generate the candidate vertices, in one or more embodiments, the vertex position discovery module again casts a ray $r_i$ for each point from each "on" sequence. The candidate vertices are found as intersections with the iso-surface at distance $df(h_i)$.

This step generates a large number of candidate vertices, some of which are unnecessary and can be removed. In particular, if we encounter two volumes in a row intersecting the ray, the space in-between them will be filled by two candidate intersections: one for "after" the first object and one for "before" the second one. However, in practical experimentation, the user usually does not need to have such a small level of refinement and one point is usually enough for curve editing. Without loss of generality, the point is chosen that is close to the back-face in our implementation, shown as "Discarded (in-between)" in FIG. 7. The user may not expect the multiple points in the middle that may cause jumps in depth in the 3D curve construction. Moreover, this step prunes, in a sense, the amount of vertices and speeds up the computation.

The candidate vertices for "on" sequences are denoted $v_i^j$ and are indexed in two ways in accordance with one or more embodiments. The lower index (FIG. 7) corresponds to the index of the ray $r_i$ that is also given by the index of the point $p_i$ in the re-sampled input stroke. The upper index j is the ordering number of the intersection on the ray, with zero being closest to the camera.

Moreover, we also assume all vertices in the first "on" sequence are not occluded i.e., the user starts drawing either off or in front of the geometry.

Having considered an example vertex position discovery module, consider now an example path discovery module in accordance with one or more embodiments.

Path Discovery Module

In one or more embodiments, the path discovery module 304 (FIG. 3) employs segment graph construction to create a graph of vertex segments at varying depths that is later used to find a desired 3-D curve. The path discovery module 304 uses a scoring process to select a final 3-D curve from the collection of points that represent the many different 3-D curve possibilities. In one or more embodiments, the path discovery module 304 does this by employing a point-to-point graph module 314 and a segment-to-segment graph module 316.

The point-to-point graph module 314 finds all plausible connections of adjacent points at various depths. In one or more embodiments, this is constrained by distance, angle, and whether a point intersects the 3-D object. So, for example, a point from the collection of points may have multiple different possibilities for the next-adjacent point on the curve. Thus, in this embodiment, the point-to-point graph module 314 is designed to find all of these plausible next-adjacent points. Non-intersecting parts and depth jumps are at undetermined positions, but are included in the graph connections. In one or more embodiments, the segment-to-segment graph module 316 is designed to enable a score to be computed which can then be used as a basis to select the final 3-D curve. The segment-to-segment graph module 316 uses the point-to-point graph to construct multiple different segments of the multiple different 3-D curve possibilities. In one or more embodiments, each segment is then scored in terms of its curvature and any other parameters that may have been defined for selecting the final 3-D curve. The segment-to-segment graph module 316 employs graph nodes that are composed of "on" points (referred to collectively as "on segments"), and graph edges which represent the parts of an input stroke that do not intersect the 3-D scene geometry (referred to collectively as "off segments"). The off segments are constructed between individual "on segments". In one or more embodiments, each graph node is scored by its total curvature and undetermined parts (i.e. "off segments") are interpolated between their determined parts (i.e. "on segments") and are subsequently scored by their curvature.

Consider now an example implementation of functionality of the path discovery module 304.

Example Implementation of Functionality of the Path Discovery Module

The process described in the section entitled "Example Implementation of Functionality of the Vertex Position Discovery Module" created candidate vertices for "on" points and identified rays that do not intersect the geometry (potential "off" points). Moreover, it also created the height function for all "off" and "on" sequences.

In order to generate the curve, one could consider individual combinations of all vertices. However, a ray $r_i$, i=1, 2, . . . , n can generate multiple candidate vertices $<v_i^0, v_i^1, \ldots v_i^k>$ and the number of possible combinations greatly increases with each added ray and possible depths at which the candidate vertices can lie. The number of possible curves increases with $O(k^n)$. Therefore, it is not feasible to calculate the curve for every combination. Fortunately, many of the combinations can be trivially rejected, for example, the connecting edge should not intersect geometry or they should have a similar distance from the camera.

In the illustrated and described embodiment, candidate vertices are grouped into segments denoted by g. A segment is a 3-D polyline that connects candidate vertices. The segments are further classified into "on" segments $\bar{g}$ and "off" segments $\hat{g}$.

Figure 7:
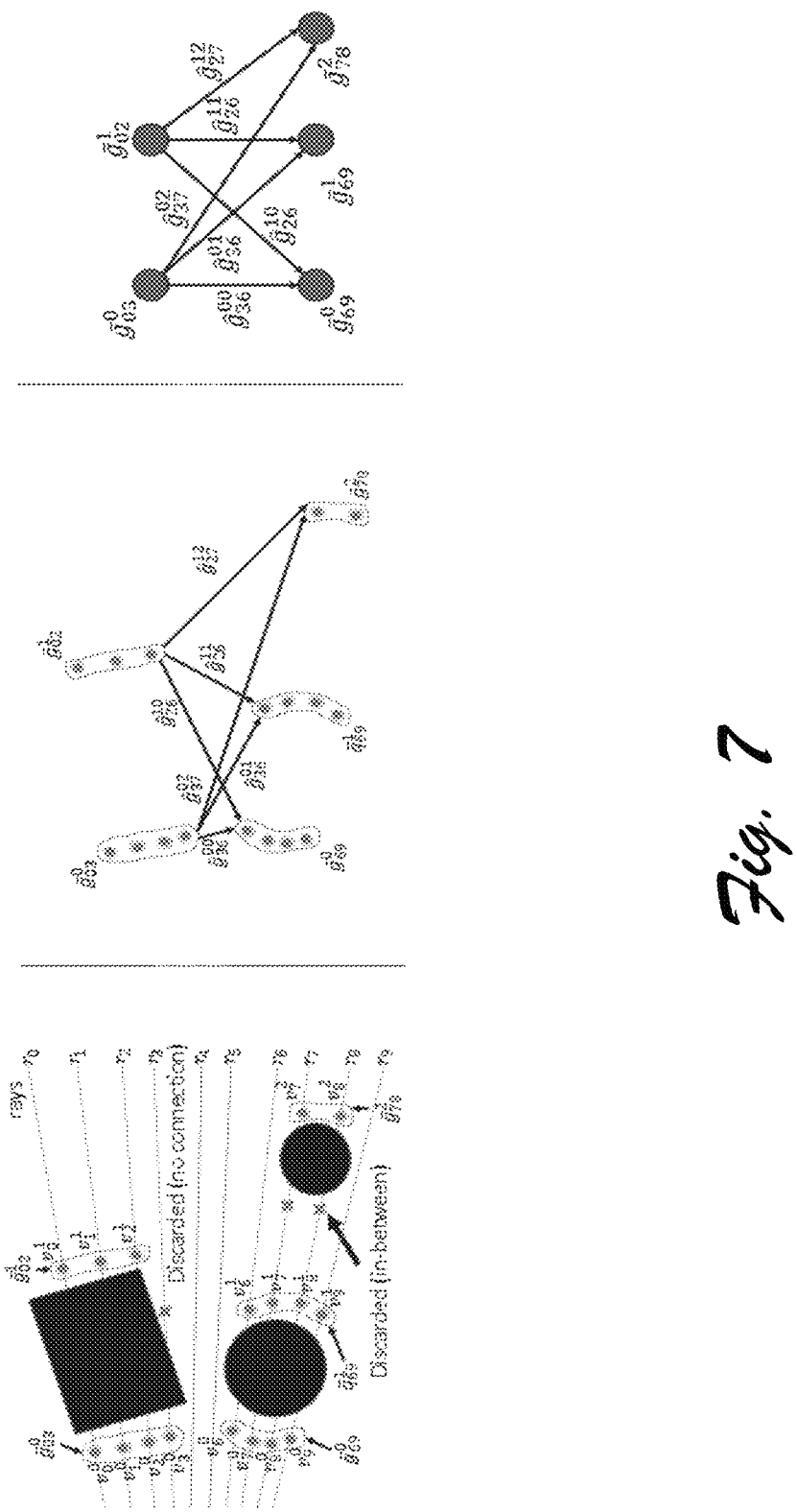
FIG. 7 illustrates segment creation and indexing from candidates vertices for "on" segments, the possible connections of the "on" segments, and the corresponding segment graph, in accordance with one or more embodiments.

In one or more embodiments, after all segments are found, a segment graph is constructed that includes all possible valid curves in the 3-D space for the given stroke, as described below. The segment graph G={N, E} has a set of nodes N that correspond to the "on" segments and edges E that correspond to the "off" segments, as shown in FIG. 7 at the right. From the segment graph the best segment is automatically offered. However, the user may select a different segment during the scene editing, for example, if the user chooses to skip part of the curve to a different depth.

The inputs that are used by the path discovery module to construct the segment graph are the scene geometry, the "on" candidate vertices, and the "off" rays. In one or more embodiments, the segment graph construction is a three step process that is described in detail below. First, candidate vertices are connected for each "on" sequence on the corresponding side of the geometry and create "on" segments. Next, the "on" segments are connected by generating off segments. There is a special case of the depth discontinuity, which was described in connection with FIG. 5 and which is further discussed below.

Consider now creation of the "on" segments. In the illustrated and described example, the "on" segments are created by connecting all candidate vertices of "on" points. Each "on" segment is denoted $\bar{g}_{se}^j$, where j is the intersection distance as above, and the lower index se denotes the start and then the end vertex. For example in FIG. 7 we have $$\bar{g}_{69}^1 = \langle v_6^1, v_7^1, v_8^1, v_9^1 \rangle$$

These segments will become the nodes N of the segment graph G (FIG. 7 right). The "on" segments are created by connecting individual candidate vertices of consecutive "on" points and then grouping them into the longest segments that can be found. In one or more embodiments, individual connections of candidate vertices are tested against three criteria: 1) the connection does not intersect the geometry (example in FIG. 7: "Discarded (no connection)", 2) the vertices lie at similar distance from the camera, and 3) the gradient of the distance field is similar at the vertex position. All segments are then found that start at a candidate vertex with no inbound connections and end at a candidate vertex with no outgoing connections.

Figure 8:
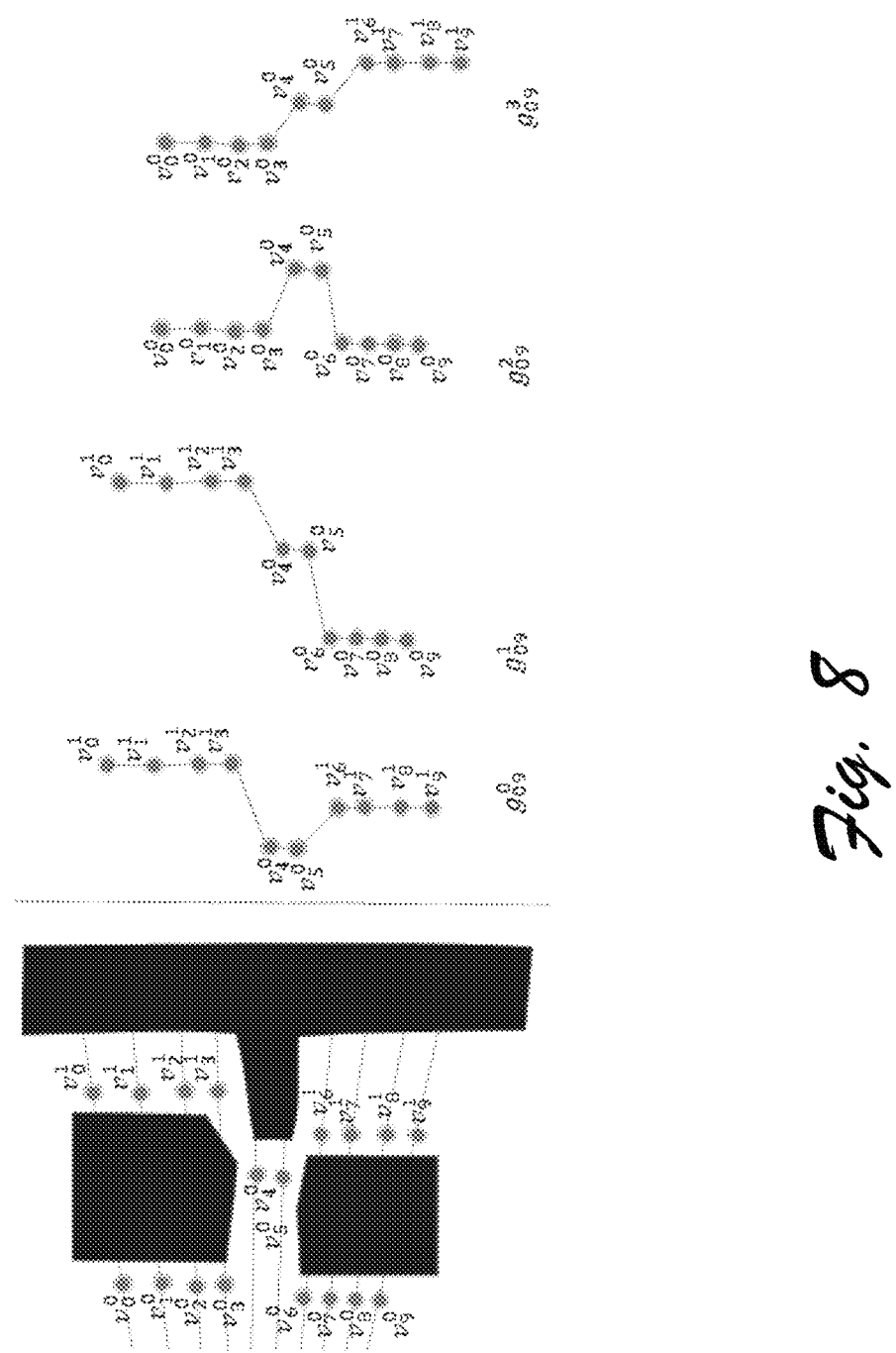
FIG. 8 illustrates depth discontinuity of an "on" segment that leads to multiple "on" segments in accordance with one or more embodiments.

While this construction is simple for a short sequence of vertices on a single side of geometry, it can be more complicated in cases depth discontinuity (FIG. 5). Each ray can generate multiple candidate vertices at different distances (vertices with varying upper index in FIG. 8), but the discontinuity will tend to merge and split the segments that would generate large zig-zag steps in the 3-D curve. By applying the above-described construction an acyclic oriented graph (the direction of the stroke defines the orientation) can be obtained. From this we extract all segments that start from the candidate vertex with the lowest index and end in the candidate vertex with the highest one (start={$v_0^0$, $v_0^1$}, end={$v_9^0$, $v_9^1$} in FIG. 8). Because of the varying depth of the vertices in each segment, the upper index of the "on" segment is given by the order in which it was extracted ($g_{09}^0, g_{09}^1, \ldots, g_{09}^3$ in the example in FIG. 8). All those segments are stored as nodes of the segment graph, because they provide alternatives for the final curve construction. Especially, a proper selection of the segment can smooth the overall curvature of the final curve.

Consider now construction of the "off" segments. In one or more embodiments, after all "on" segments are constructed we can connect them by constructing the "off" segments. Because there are multiple combinations on how the segments can be connected, we use the graph G where the "on" segments are its nodes and the "off" segments correspond to the graph edges as shown in an example in FIG. 7 (middle). Each "on" segment (FIG. 7 left) is connected to all segments that are accessible by skipping a sequence of "off" rays. Every such connection is an edge in the segment graph (FIG. 7, right).

Figure 9:
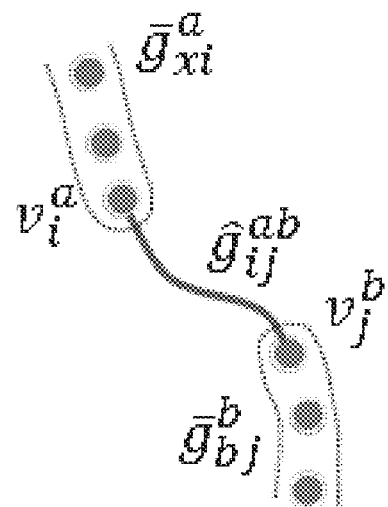
FIG. 9 illustrates an "off" segment in accordance with one or more embodiments.

In FIG. 9, the "off" segment $\hat{g}_{ij}^{ab}$ corresponds to an edge in G that connects two "on" segments $\bar{g}_{x\,i}^a$ and $\bar{g}_{j\,y}^b$. More precisely, the "off" segment $\hat{g}_{i\,j}$ connects the last vertex $v_i^a$ from the first "on" segment with the first vertex of the second segment $v_j^b$. Note that we need the upper indices for an "off" segment, because the vertices $v_i$ and $v_j$ can be at different depths that would cause multiple off edges with the same lower indices.

In one or more embodiments, to find the "off" vertices of the "off" segment $\hat{g}_{i\,j}^{ab} = \langle w_{i+1}, \ldots, w_{j-1}\rangle$ we interpolate the depth of $v_i^a$ and $v_j^b$. In other words, we interpolate between $d_i = \|c - v_i^a\|$ and $d_j = \|c - v_j^b\|$, where c is the position of the camera.

Figure 10:
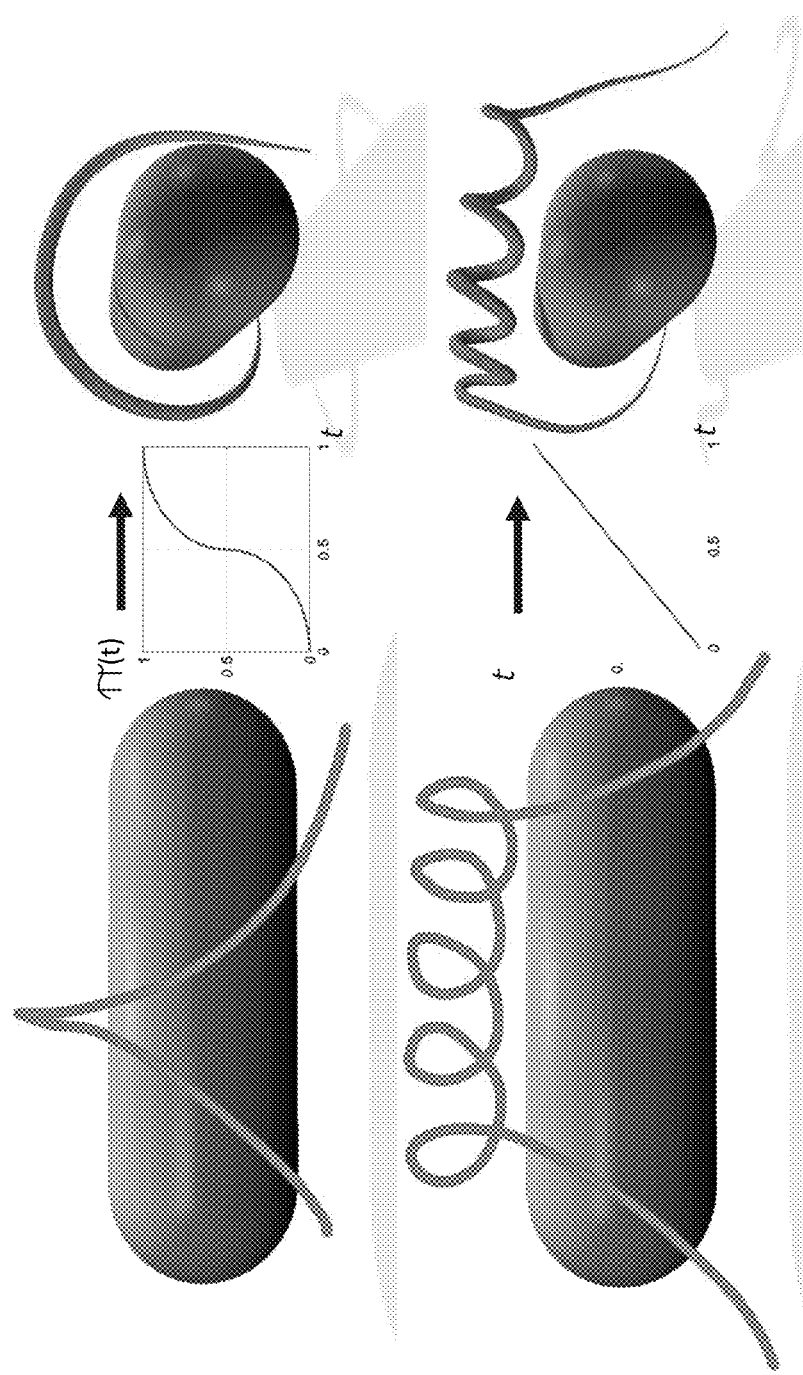
FIG. 10 illustrates "off" segment interpolation in accordance with one or more embodiments.

The input sketch of the "off" segment defines a surface going through the rays $\langle r_{i+1}, \ldots, r_{j-1}\rangle$ over which we interpolate the depth. Since the user is free to draw virtually any shape, such as loops, zig-zags etc., we cannot always guarantee the "off" segment to be smooth. For most cases we use linear interpolation of $d_i$ and $d_j$ to calculate the vertices as shown in FIG. 10 (bottom), which illustrates "off" segment interpolation. In the top portion of FIG. 10, an off segment with a single corner in the initial sketch is interpolated by using Equation 1 (below). Otherwise, linear interpolation is used for the sketch and the bottom portion of FIG. 10. This produces a reasonably smooth segment, especially if the input sketch is also smooth. However, the linear interpolation fails when there is a single sharp corner in the input sketch. These sharp corners can be detected by using an approach as described in Ben-Haim, D., Harary, G., and Tal, A. 2010. Piecewise 3d euler spirals. In *Proceedings of the 14th ACM Symposium on Solid and Physical Modeling*, ACM, New York, N.Y., USA SPM '10, 201-206, and using sigomoidal interpolation that achieves a smoother result that is closer to a circular arc, as shown in the top portion of FIG. 10:

$$d(t) = d_i(1 - \pi(t)) + d_j \pi(t),$$

where $\pi(t)$ $$\pi(t) = \begin{cases} -\frac{1}{2}\sqrt{1 - (2t)^2} + \frac{1}{2} & \text{if } t \in [0, 0.5] \\ \frac{1}{2}\sqrt{1 - (2t-2)^2} + \frac{1}{2} & \text{if } t \in (0.5, 1] \end{cases}$$

Furthermore, an "off" segment can begin on the first ray or end on the last ray. In this case, in one or more embodiments, we do not use interpolation. For an "off" segment $\hat{g}_{0i}^{xa}$ beginning on the first ray we calculate the average change in depth $\overline{\Delta d}$ of several vertices of the following on segment $\overline{g}_{iy}^b$. We then extrapolate the vertices of $\hat{g}0b$ as follows $$w_q = c + (d_i + (i-q)\overline{\Delta d})r_q.$$

The case of an "off" segment ending on the last ray, $\hat{g}_{i|P|}^{ay}$ is analogous and the "on" segment used is the previous one $\overline{g}_{x\,i}^a$. To connect these outer "off" segments and maintain the graph structure, we add a node $\overline{g}_{0\,0}^0$ or $\overline{g}_{|P||P|}^0$ at the beginning or end, respectively, that have zero length.

Figure 11:
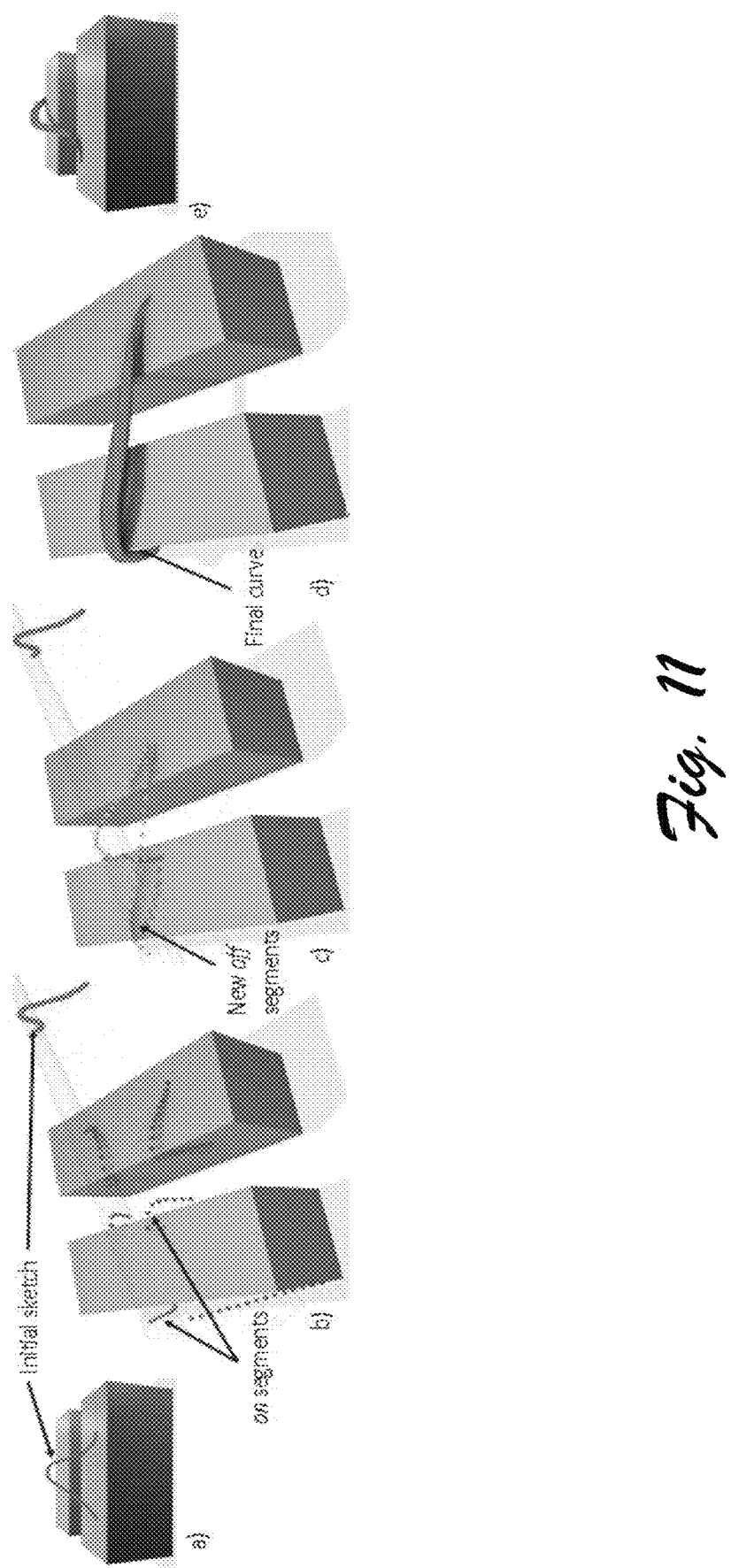
FIG. 11 illustrates depth discontinuity processing in accordance with one or more embodiments.

Consider now the notion of depth discontinuity mentioned above, in connection with FIG. 11 which illustrates at: (a) an initial sketch relative to scene geometry, (b) corresponding "on" segments, (c) new "off" segments, and (d) and (e) the final curve.

In this example, direct connection of the consecutive "on" segments (at (b)) would generate sharp corners with large depth jumps. To avoid this situation, new "off" segments are generated (at (c)) that bridge the "on" segments that participate in depth discontinuity. Note the new "off" segment is in fact parallel to the "on" segment, but connects the "on" segment that is behind the second object. In one or more embodiments, when multiple depth discontinuities occur, the curve generation algorithm described just below will select the smoothest path in the graph that corresponds to the curve passing behind the last object. This is also the typical intuitive choice of the users, but it can be overridden if needed.

Having considered an example implementation of the path discovery module 304, consider now an example final curve construction module in accordance with one or more embodiments.

Final Curve Construction Module

In one or more embodiments, the final curve construction module 306 (FIG. 3) employs a shortest path module 318 to find the shortest or best path through the segment-to-segment graph. Once the best path is found through the segment-to-segment graph, in one or more embodiments, a curve fitting module 320 constructs a smooth cubic spline as the final 3-D curve. It does so by considering the scores of each segment (both "on" and "off" segments), and reconstructing the 3-D curve from segments having the best scores to produce the final 3-D curve that constitutes a concatenation of the selected segments. The final 3-D can then be smoothed using various constraints. In addition, editing operations such as changes in curve depth and curve redrawing can be provided. Thus, a designer may select a segment that is drawn in front of the 3-D scene geometry to now appear to pass behind the 3-D scene geometry and vice versa.

Consider now an example implementation of the functionality of the final curve construction module 306.

Example Implementation of the Final Curve Construction Module

Figure 12:
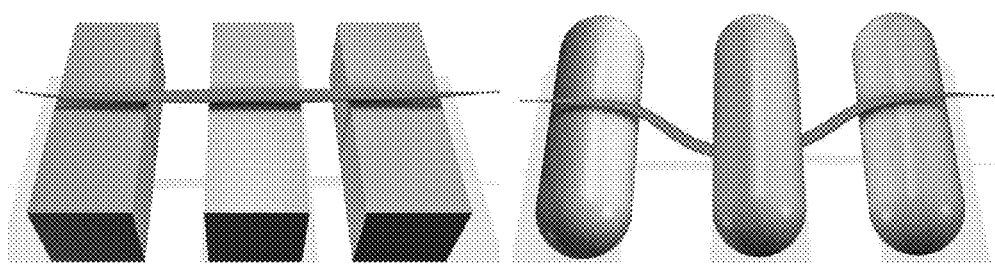
FIG. 12 illustrates a path selection process in accordance with one or more embodiments.

The process described above in the "Example Implementation . . . " sections created a graph G that contains interconnected "on" and "off" segments (FIG. 2). A number of curves can be generated by finding paths in G that go through all the rays of the initial sketch. However, not all curves have good visual properties. Accordingly, an intuition can be employed that suggests that the curve should be smooth and follow the curvature of the underlying geometry. FIG. 12 shows that if the geometry is round the curve will likely go behind the object. That is, the path selection attempts to keep the curvature of the "off" segment constant. In this way, the underlying geometry navigates the direction of the curve.

Accordingly, in the illustrated and described embodiment, to select the best path, a weight is defined for the nodes and edges of G that is based on curvature of the individual segments. When a best path through the graph is found, the traversed segments are connected into a single curve. Finally, the curve is resampled and iteratively smoothed, while making sure that the final curve does not deviate from the initial sketch and that the height of the curve is preserved.

In the illustrated and described embodiment, one way to select a curve is by considering its so-called "fairness." The general notion of fairness is described in Levien, R. and Sequin, C. H. 2009. Interpolating splines: Which is the fairest of them all? *Computer Aided Design and Applications* 6, 1, 91-102, where the authors note that one of the indicators of a fair curve is its monotonous curvature.

Since the curve is being stitched together by the shortest path module 318 from segments, in one or more embodiments, a criterion is utilized that can be evaluated independently for each segment and reused for different final curves.

Any suitable criterion can be used. By way of example and not limitation, the criterion employed by the shortest path module 318 is the integral of absolute change in curvature that is denoted K:

$$K = \int |k(s)'| ds, k(s) = \|T'(s)\|,$$

where s is the arc length parameter of the curve and k(s) is the curvature defined by using the unit tangent vector T. The discrete curvature is estimated for each "on" segment $\bar{g}_{i,j}{}^a$ from its vertices $\langle v_i{}^a, v_{i+1}{}^a \ldots v_j{}^a \rangle$. The curvature of the "off" segments is calculated from its vertices but also from the last and first vertices of the connecting "on" segments (FIG. 9). This ensures that any sharp connection between "on" and "off" segments is penalized. The curvature is estimated differently for input strokes that form a loop. If the first point $p_0$ and the last point $p_{|P|}$ of the input 2-D stroke are within a small distance which can be selected by the designer, the first and last segments are merged and the curvature is estimated for this merged segment.

In the process described above, the path discovery module 304 assigned the weights to nodes and edges of the graph. In this step, the shortest path module 318 finds the path through the graph that will represent the final curve. Such a path has to start with a segment that includes the vertex for the first ray, i.e., any segment $\bar{g}_{0,x}{}^a$, and end with a segment that includes the vertex for the last ray, i.e., any segment $\bar{g}_{y,|P|}{}^b$. In the case of beginning or ending the stroke off the geometry, recall that these segments can be zero length ($\bar{g}_{0,0}{}^0$ or $\bar{g}_{|P|,|P|}{}^0$). The graph is implicitly topologically sorted, therefore the shortest path module 318 can simply perform a depth first traversal from the nodes starting at first ray and perform edge relaxation, noting the best predecessors at each node. To construct the curve, in one or more embodiments, the best predecessors are retraced from all nodes ending at |P| and concatenate the segments. In the illustrated and described example, Catmull-Rom splines are used by the shortest path module 318 to construct the final curve geometry.

Consider now curve smoothing techniques employed by the curve fitting module 320.

The process described just above generates a 3-D curve that follows the scene geometry. However, the curve may have some sharp turns. To improve the curve quality, the 3-D curve is resampled and iteratively smoothed.

Recall that the 2-D points are equidistant in 2-D. However, when projected to 3-D, the distance between successive vertices of the 3-D curve is not constant so curve fitting module 320 resamples the curve in 3-D so that the distance between vertices is constant. Any suitable technique can be utilized to resemble the curve including, by way of example and not limitation, the approach described in Kass, M., Witkin, A., and Terzopoulos, D. 1988. Snakes: Active contour models. *International Journal of Computer Vision* 1, 4, 321-331. As such, the active contours approach can be used to smooth the 3D curve with two additional constraints. First, we make sure that the final curve's projection to the sketching viewpoint is similar to the sketched 2-D curve. Second, we preserve curve height h that was defined above. In the illustrated and described example, to smooth the curve, the curve fitting module 320 minimizes the energy of the curve E by using the gradient descent:

$$E = \int_0^1 (E_{internal}(s) + E_{external}(s)) ds$$

The internal energy is the sum of continuity and smoothness energies:

$$E_{internal}(s) = \alpha \left\| \frac{dv(s)}{ds} \right\|^2 + \beta \left\| \frac{d^2 v(s)}{ds^2} \right\|^2$$

where v(s) is the position of the curve at arc length parameters $s \in (0, 1)$. The external energy is defined as:

$$E(s) = \gamma |r(v(s)) \cdot \Gamma(s)| + \delta |d(v(s)) - h(s)|$$

where r (v(s)) is the direction of the ray from the camera to v(s), $\Gamma(s)$ is the direction of the ray from the initial sketch at s, d(v(s)) is the distance of v(s) the geometry, and h(s) is the height of the curve at s. The $\alpha$, $\beta$, $\gamma$, $\delta$, are respective weights of individual terms and $\alpha+\beta+\gamma+\delta=1$. We use $\alpha=0.0039$, $\beta=0.011$, $\gamma=0.982$, and $\delta=0.0019$ in the current example.

Consider now curve and scene editing in accordance with one or more embodiments.

The techniques described above offer by default a smooth curve that keeps the distance from the surface as defined by the user strokes and follows the surface geometry. However, this may not be always the user's choice. Accordingly, the 3-D drawing module 110 we can provide alternative curves that are stored in the segment graph G.

Stroke modifiers allow the user to change the selected curve while drawing. Using a bidirectional gesture, such as a mouse wheel, the user can change the depth of the last inferred segment. The depth is only a suggestion, as further stroke points can change the configuration of the curve. Furthermore, a modal gesture, like a key being pressed, can disable intersections. This is particularly useful in dense scenes, since otherwise the system automatically assumes that any geometry intersecting the stroke will have an effect on the final curve.

Figure 13:
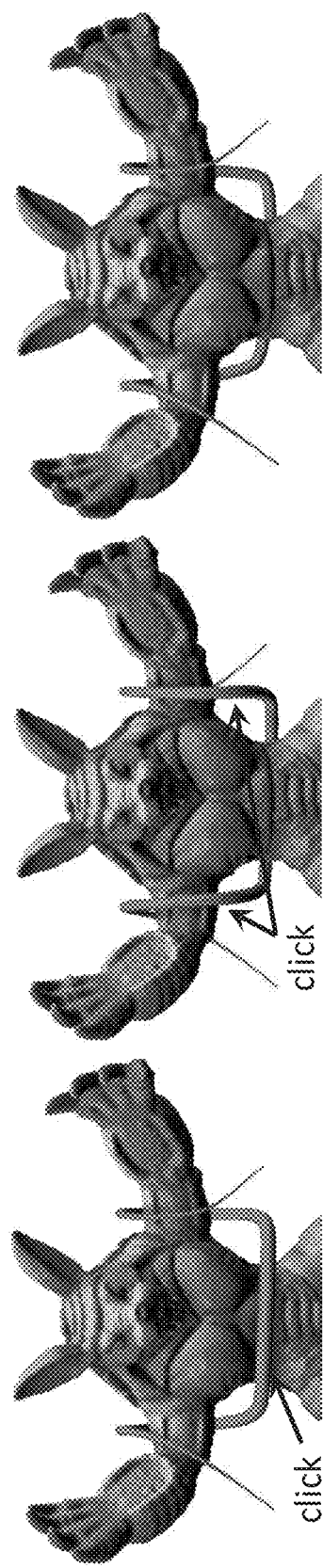
FIG. 13 illustrates curve modification after a curve has been calculated in accordance with one or more embodiments.

After the stroke has been finished, in one or more embodiments, the user can modify the curve by redrawing its part or changing the depth of certain segments. The redrawing can be done from any viewpoint and is performed by inferring a new curve from a redraw stroke which then replaces the part of the original curve that is being redrawn. Furthermore, the depth of individual parts of the curve (the "on" segments) can be selected manually, again by using a bidirectional gesture such as the mouse wheel, as shown in FIG. 13. There, once the segment graph has been calculated, the curve can be modified by simply clicking on the two-D stroke or the geometry covering the stroke to change its depth.

Figure 14:
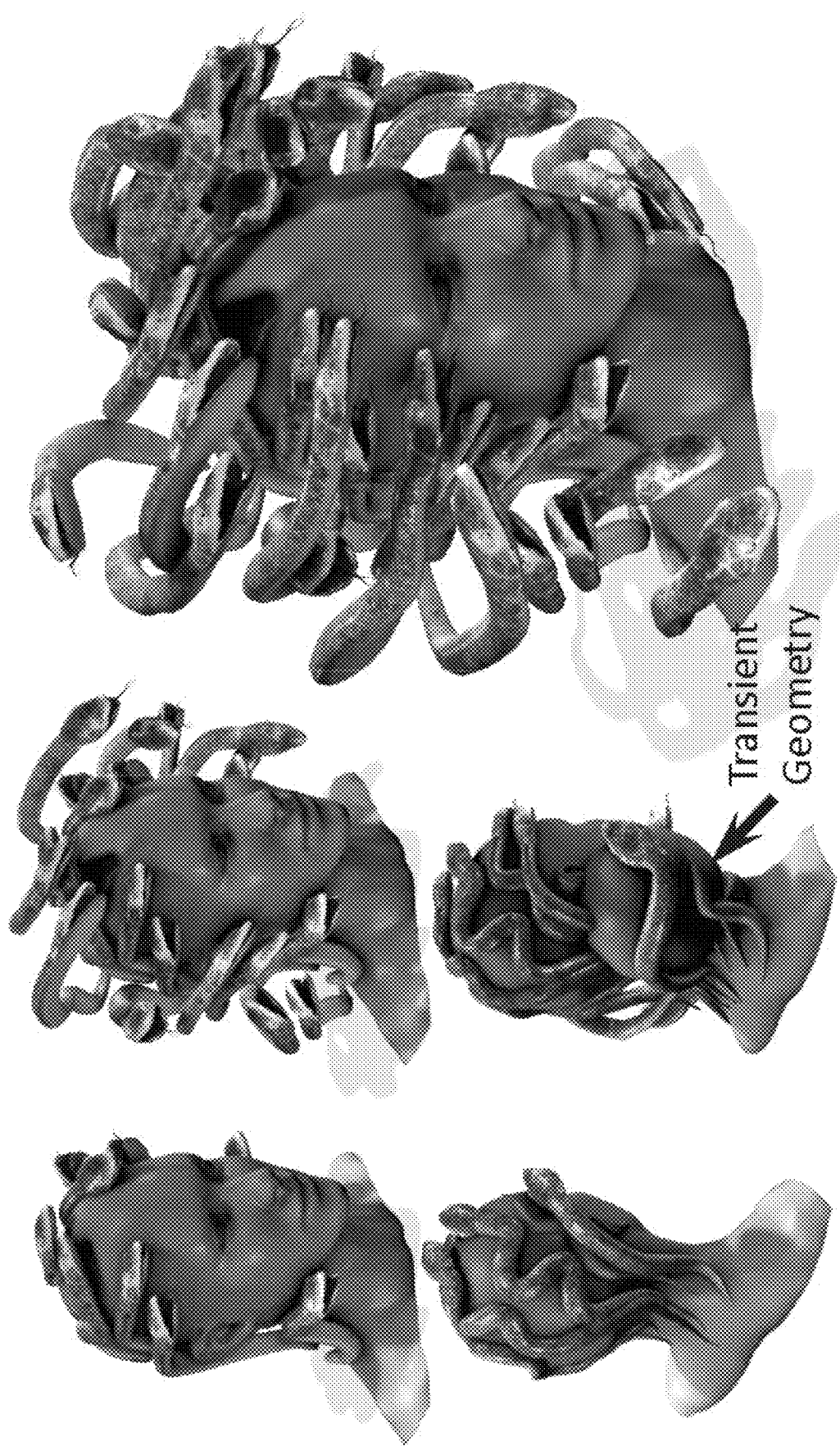
FIG. 14 illustrates use of transient geometry in accordance with one or more embodiments.
Figure 15:
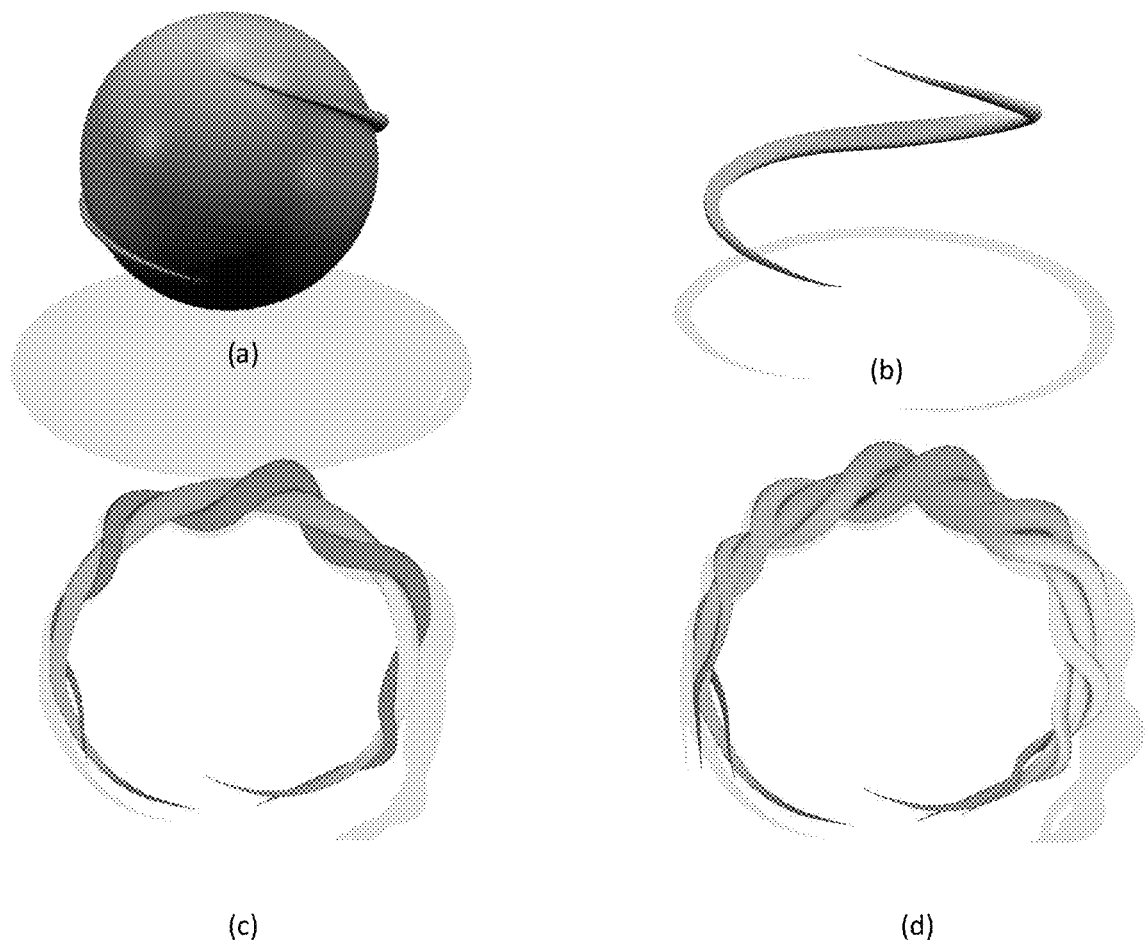
FIG. 15 illustrates a transient object in accordance with one or more embodiments.

Consider now the notion of transient geometry. Transient geometry is a powerful way to model the curves. Transient objects work as scaffolds for the 3D curves. Transient objects can be added by clicking on a surface of an existing object. The object is placed perpendicularly to the surface and the mouse wheel controls its scale. If there is no object in the scene, the transient object is placed to the origin. Once the transient object is not needed it can be removed by shift click. Similarly, any new 3D geometry created around the space curves generated by the system can act as a transient geometry and can be removed at any stage. For example, FIG. 14 shows how several transient objects were used to produce snakes that stay farther from the head. The process illustrated in FIG. 15 is similar, except that the initial transient sphere was placed at the origin. Note that the transient sphere is used as a shape-defining object and after a first sketch at (a), the transient object is deleted at (b). The first curve becomes part of the scene and is used to wrap several additional curves around as an (c) and (d). The overall look of the resulting geometry is defined by the initial transient sphere.

The illustrated and described curve-drawing process constitutes an improvement over current approaches which require constant rotation of a 3-D object to enable a curve to be drawn. In the illustrated and described embodiments, such constant object rotation is unnecessary because the curve path is able to be inferred through an improved curve-drawing process that employs the vertex position discovery module, the path discovery module, and the final curve construction module described above.

Having considered embodiments described above, consider now an example procedure in accordance with one or more embodiments.

Example Procedure

FIG. 16 illustrates an example procedure 1600 for drawing a curve relative to a 3-D object in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of 3-D drawing module 110, such as that described above. A 3-D drawing module implementing procedure 1600 may be an independent application that has been installed on computing device 102, a service hosted by a service provider that is accessible by computing device 102, or a plug-in module to computing device 102. Furthermore, a 3-D drawing module implementing procedure 1600 may be an application implemented at least partly on a client application of a client device, such as user device 116-1, 116-2, and 116-3.

Referring to FIG. 16, input defining a 2-D curve that has been drawn relative to a 3-D object is received at block 1602. The input can be received in any suitable way. For example, a designer may provide input by way of an input device such as a mouse, stylus, touch input, natural user interface, gesture, and the like. Next, point positions associated with the 2-D curve are discovered at block 1604. In the illustrated and described embodiment, point positions can be discovered using a vertex position discovery module such as that described above. The vertex position discovery module first ascertains intersecting and non-intersecting intervals of the drawn 2-D curve relative to a 3-D object. In one or more embodiments, it does so through a segmentation process that also identifies depth jumps which define intersecting intervals at different depths relative to the 3-D object. An example of how this can be done is provided above. Once the intersecting and non-intersecting intervals are ascertained, in one or more embodiments, a distance estimation module is used to estimate the distance of individual points that lie on rays that are projected through the drawn 2-D curve relative to the 3-D object. A graph is constructed from the discovered point positions at block 1606. In the illustrated and described embodiment, the graph is constructed using an isosurface intersection module, such as the one described above. That is, once the distances of the individual points on a ray are estimated, the isosurface intersection module is employed to find all points on a particular ray at a given distance relative to the 3-D object.

The constructed graph is now processed to define multiple different 3-D curves at block 1608. In the illustrated and described embodiment, this operation can be performed using a path discovery module that first builds a point-to-point graph that finds all plausible connections of adjacent points at various depths. The various different points define specific curve coordinates that can be close to the surface of the 3-D object. As noted above, the graph represents a collection of possibilities of where the curve may lie. In one or more embodiments, the point-to-point graph is then processed by the segment-to-segment module to provide a segment-to-segment graph which walks through the point-to-point graph. That is, the point-to-point graph is processed to define individual segments, where each segment includes a coherent set of points from the point-to-point graph. Each segment is defined by multiple graph nodes and graph edges. In one or more embodiments, the graph nodes and graph edges are scored, as described above, to take into account the curvature and smoothness of the curves that are made up by a collection of segments. Thus, each of the multiple different 3-D curves is scored in terms of their respective curvatures and smoothness and whatever other constraints may have been defined for the curves. In the illustrated and described embodiment, the constructed graph is processed to define the multiple different 3-D curves without having to visually rotate the 3-D object. As noted above, this constitutes an improvement over past approaches which necessarily required to 3-D object to be continually rotated so that the designer could draw a curve relative to the object.

A final 3-D curve is then selected, at block 1610, that satisfies one or more constraints that have been defined for the final 3-D curve. In the illustrated and described embodiment, a "shortest" path approach can be utilized to select a 3-D curve having the smallest score as the final 3-D curve. The final 3-D curve can then be smoothed in accordance with any constraints that have been defined for the curve. The constraints can pertain to the curvature and smoothness of the curve. An example of such constraints is provided above.

Thus, the technical solution provided by the various embodiments described above solves the technical problem of having to constantly rotate the 3-D object which is computationally expensive, visually distracting, and time-consuming for a user. The technical solution enables a 3-D curve to be quickly rendered around a 3-D object to provide a user with quick and fairly immediate feedback on what the curve they have drawn looks like in 3-D space.

The above described embodiments are useful in a wide variety of circumstances and scenarios. For example, the techniques described above can be employed in computer animation, dynamic lighting, camera path planning and the like. The described approaches improve upon past techniques by employing methods that do not require a 3-D object to be visually rotated to enable a curve to be drawn around the object.

Having considered the embodiments described above, consider now an example system and device that can be utilized to implement the described embodiments.

Example System and Device

Figure 17:
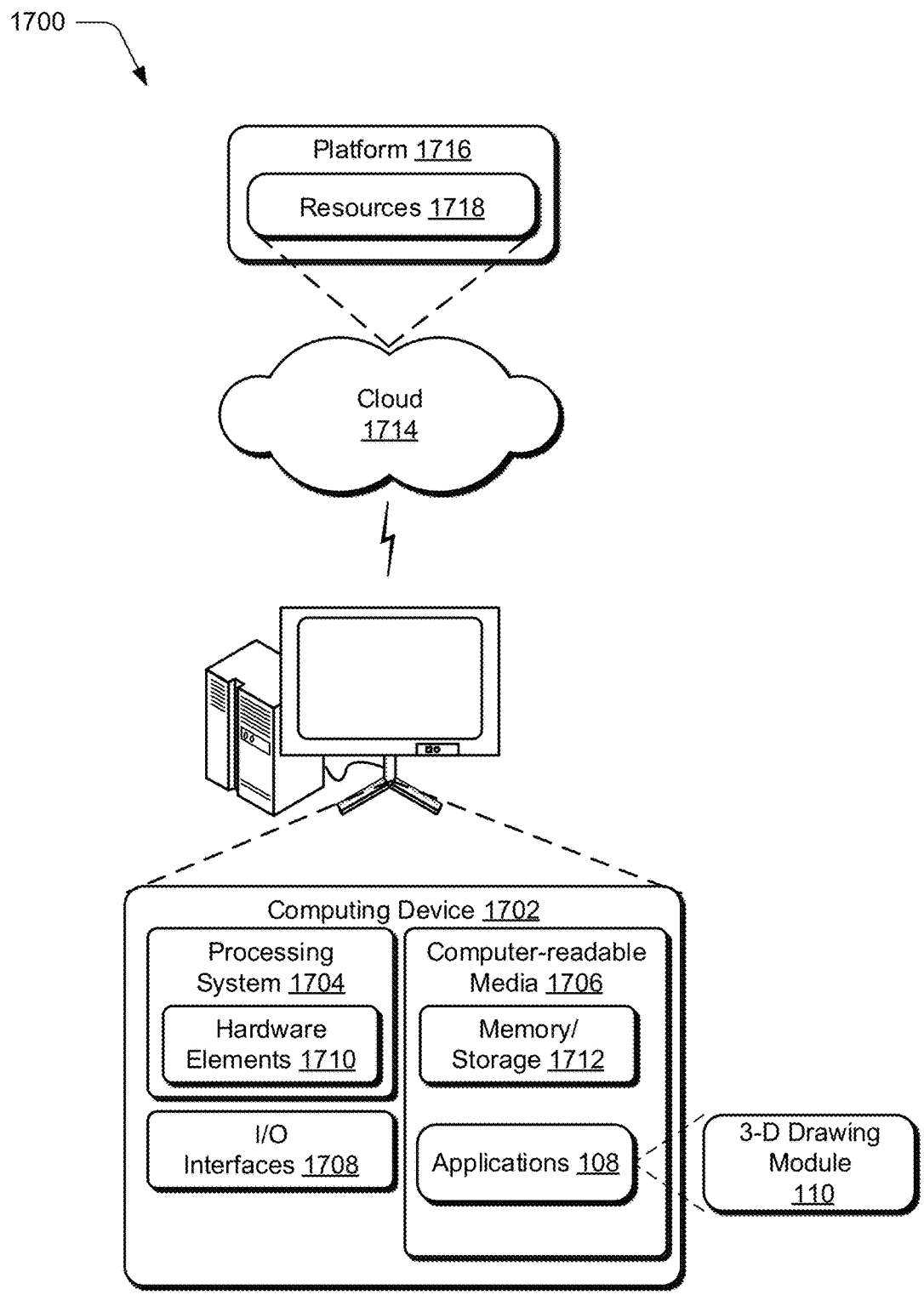
FIG. 17 illustrates an example system including various components of an example device that can be employed for one or more implementations described herein.

FIG. 17 illustrates an example system generally at 1700 that includes an example computing device 1702 that is representative of one or more computing systems and devices that may implement the various techniques described herein. This is illustrated through inclusion of the applications 108 and, in particular, 3-D drawing module 110, which operates as described above. The computing device 1702 may be, for example, a server of a service provider, a device associated with a client (e.g., a client device), an on-chip system, or any other suitable computing device or computing system.

The example computing device 1702 includes a processing system 1704, one or more computer-readable media 1706, and one or more I/O interfaces 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware elements 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 1706 is illustrated as including memory/storage 1712. The memory/storage 1712 represents memory/storage capacity associated with one or more computer-readable media. The memory/storage component 1712 may include volatile media (such as random access memory (RAM)), nonvolatile media (such as read only memory (ROM), Flash memory, optical disks, magnetic disks, and so forth), or combinations thereof. The memory/storage component 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1702. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic, fixed device logic implemented in a hardware form, or combinations thereof that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1710, or combinations thereof. The computing device 1702 may be configured to implement particular instructions and functions corresponding to the software and hardware modules. Accordingly, implementation of a module that is executable by the computing device 1702 as software may be achieved at least partially in hardware, e.g., through use of computer-readable storage media and hardware elements 1710 of the processing system 1704. The instructions and functions may be executable/operable by one or more articles of manufacture (for example, one or more computing devices 1702 or processing systems 1704) to implement techniques, modules, and examples described herein.

The techniques described herein may be supported by various configurations of the computing device 1702 and are not limited to the specific examples of the techniques described herein. This functionality may also be implemented all or in part through use of a distributed system, such as over a "cloud" 1714 via a platform 1716 as described below.

The cloud 1714 includes and is representative of a platform 1716 for resources 1718. The platform 1716 abstracts underlying functionality of hardware (e.g., servers) and software resources of the cloud 1714. The resources 1718 may include applications, data, or applications and data that can be utilized while computer processing is executed on servers that are remote from the computing device 1702. Resources 1718 can also include services provided over the Internet, through a subscriber network, such as a cellular or Wi-Fi network, or combinations thereof.

The platform 1716 may abstract resources and functions to connect the computing device 1702 with other computing devices. The platform 1716 may also serve to abstract scaling of resources to provide a corresponding level of scale to encountered demand for the resources 1718 that are implemented via the platform 1716. Accordingly, in an interconnected device embodiment, implementation of functionality described herein may be distributed throughout the system 1700. For example, the functionality may be implemented in part on the computing device 1702 as well as via the platform 1716 that abstracts the functionality of the cloud 1714.

Conclusion

Various embodiments enable curves to be drawn around 3-D objects by intelligently determining or inferring how the curve flows in the space around the outside of the 3-D object. The various embodiments enable such curves to be drawn without having to constantly rotate the 3-D object. In at least some embodiments, curve flow is inferred by employing a vertex position discovery process, a path discovery process, and a final curve construction process.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including a computing device executing a 3-D drawing module to perform an improved method for drawing a 3-D curve relative to a 3-D object, the method comprising:

receiving, by the computing device, an input defining a 2-D curve that has been drawn relative to the 3-D object;

converting, by the computing device, the 2-D curve into a plurality of 2-D points;

discovering, by the computing device, candidate 3-D vertices for each of the plurality of 2-D points, the candidate 3-D vertices defining a potential location in a 3-D space for each of the plurality of 2-D points;

building, by the computing device, a point-to-point graph having the candidate 3-D vertices;

estimating, by the computing device, distances of the candidate 3-D vertices from the 3-D object;

processing, by the computing device, the point-to-point graph to define a plurality of vertex segments, each vertex segment of the plurality of vertex segments including a set of the candidate 3-D vertices;

constructing, by the computing device, from the estimated distances of the candidate 3-D vertices from the 3-D object and the plurality of vertex segments, a segment-to-segment graph;

processing, by the computing device, the segment-to-segment graph to define multiple different 3-D curves relative to the 3-D object; and selecting, by the computing device, from the multiple different 3-D curves, a final 3-D curve having a topology that includes curve portions that flow behind and in front of the 3-D object.

2. The method as described in claim 1, wherein the discovering candidate 3-D vertices further comprises determining depth jumps which define intersecting intervals of the 2-D curve at different depths relative to the 3-D object.

3. The method as described in claim 1, wherein the discovering candidate 3-D vertices further comprises defining, for at least some of the candidate 3-D vertices, multiple distance options to account for different location possibilities for the at least some of the candidate 3-D vertices relative to the 3-D object.

4. The method as described in claim 1, wherein the selecting further comprises employing a shortest path approach that determines the shortest path through the segment-to-segment graph.

5. The method as described in claim 1, further comprising, after the selecting, smoothing the final 3-D curve using a constraint equation.

6. The method as described in claim 1, wherein the estimating the distances of candidate 3-D vertices from the 3-D object further comprises projecting rays through the plurality of 2-D points.

7. The method as described in claim 1, further comprising rendering the final 3-D curve relative to the 3-D object.

8. A system implemented in a digital medium environment including a computing device configured to draw a 3-D curve relative to a 3-D object, the system comprising:

a processing system; and at least one computer readable medium storing instructions executable via the processing system to implement a 3-D drawing module configured to perform operations, comprising:

receiving an input defining a 2-D curve that has been drawn relative to the 3-D object;

converting the 2-D curve into a plurality of 2-D points;

discovering candidate 3-D vertices for each of the plurality of 2-D points, the candidate 3-D vertices defining a potential location in a 3-D space for each of the plurality of 2-D points;

building a point-to-point graph having the candidate 3-D vertices;

estimating distances of the candidate 3-D vertices from the 3-D object;

processing the point-to-point graph to define a plurality of vertex segments, each vertex segment of the plurality of vertex segments including a set of the candidate 3-D vertices;

constructing, from the estimated distances of the candidate 3-D vertices from the 3-D object and the plurality of vertex segments, a segment-to-segment graph;

processing the segment-to-segment graph to define multiple different 3-D curves relative to the 3-D object; and selecting, from the multiple different 3-D curves, a final 3-D curve having a topology that includes curve portions that flow behind and in front of the 3-D object.

9. The system as described in claim 8, wherein the discovering candidate 3-D vertices further comprises determining depth jumps which define intersecting intervals of the 2-D curve at different depths relative to the 3-D object.

10. The system as described in claim 8, wherein the discovering candidate 3-D vertices further comprises defining, for at least some of the candidate 3-D vertices, multiple distance options to account for different location possibilities for the at least some of the candidate 3-D vertices relative to the 3-D object.

11. The system as described in claim 8, wherein the selecting further comprises employing a shortest path approach that determines the shortest path through the segment-to-segment graph.

12. The system as described in claim 8, further comprising, after the selecting, smoothing the final 3-D curve using a constraint equation.

13. The system as described in claim 8, wherein the 3-D drawing module is further configured to project rays through the plurality of 2-D points.

14. The system as described in claim 8, wherein the 3-D drawing module is further configured to render the final 3-D curve relative to the 3-D object.

15. One or more non-transitory computer-readable storage media comprising instructions stored thereon that, responsive to execution by a computing device in a digital medium environment for drawing a 3-D curve relative to a 3-D object, cause operations of the computing device comprising:

receiving an input defining a 2-D curve that has been drawn relative to the 3-D object;

converting the 2-D curve into a plurality of 2-D points;

discovering candidate 3-D vertices for each of the plurality of 2-D points, the candidate 3-D vertices defining a potential location in a 3-D space for each of the plurality of 2-D points;

building a point-to-point graph having the candidate 3-D vertices;

estimating distances of the candidate 3-D vertices from the 3-D object;

processing the point-to-point graph to define a plurality of vertex segments, each vertex segment of the plurality of vertex segments including a set of the candidate 3-D vertices;

constructing, from the estimated distances of the candidate 3-D vertices from the 3-D object and the plurality of vertex segments, a segment-to-segment graph;

processing the segment-to-segment graph to define multiple different 3-D curves relative to the 3-D object; and selecting, from the multiple different 3-D curves, a final 3-D curve having a topology that includes curve portions that flow behind and in front of the 3-D object.

16. The one or more non-transitory computer-readable storage media as described in claim 15, the operations of the computing device further comprising determining depth jumps which define intersecting intervals of the 2-D curve at different depths relative to the 3-D object.

17. The one or more non-transitory computer-readable storage media as described in claim 15, the operations of the computing device further comprising smoothing the final 3-D curve.

18. The one or more non-transitory computer-readable storage media as described in claim 15, wherein the estimating the distances of the candidate 3-D vertices from the 3-D object further comprises projecting rays through the plurality of 2-D points.

19. The one or more non-transitory computer-readable storage media as described in claim 15, wherein the discovering the candidate 3-D vertices further comprises defining, for at least some of the candidate 3-D vertices, multiple distance options to account for different location possibilities for the at least some of the candidate 3-D vertices relative to the 3-D object.

20. The one or more non-transitory computer-readable storage media as described in claim 15, the operations of the computing device further comprising rendering the final 3-D curve relative to the 3-D object.

* * * * *

UNITED STATES PATENT AND TRADEMARK OFFICE
CERTIFICATE OF CORRECTION

PATENT NO. : 10,657,682 B2
APPLICATION NO. : 15/485980
DATED : May 19, 2020
INVENTOR(S) : Vojtech Krs et al.

It is certified that error appears in the above-identified patent and that said Letters Patent is hereby corrected as shown below:

In the Claims

Column 24, Line 60, after "operations", delete ",", therefor.

Signed and Sealed this
Sixteenth Day of June, 2020

Andrei Iancu
*Director of the United States Patent and Trademark Office*